United States Patent
Saito

(10) Patent No.: US 12,309,113 B2
(45) Date of Patent: *May 20, 2025

(54) COMMUNICATION APPARATUS, METHODS, AND NON-TRANSITORY COMPUTER-READABLE MEDIA FOR DETERMINING IP ADDRESSES FOR USE IN DIFFERENT NETWORKS

(71) Applicant: BROTHER KOGYO KABUSHIKI KAISHA, Nagoya (JP)

(72) Inventor: Ken Saito, Tokoname (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/653,634

(22) Filed: May 2, 2024

(65) Prior Publication Data

US 2024/0283769 A1    Aug. 22, 2024

Related U.S. Application Data

(63) Continuation of application No. 18/156,773, filed on Jan. 19, 2023, now Pat. No. 12,021,823, which is a
(Continued)

(30) Foreign Application Priority Data

Jan. 31, 2012  (JP) .................................. 2012-019088

(51) Int. Cl.
*H04L 12/28* (2006.01)
*H04L 12/26* (2006.01)
(Continued)

(52) U.S. Cl.
CPC .......... *H04L 61/00* (2013.01); *H04L 61/5014* (2022.05); *H04L 61/5038* (2022.05); *H04L 61/5046* (2022.05); *H04L 61/5061* (2022.05)

(58) Field of Classification Search
CPC . H04L 61/00; H04L 61/5014; H04L 61/5038; H04L 61/5046; H04L 61/5061
See application file for complete search history.

(56) References Cited

U.S. PATENT DOCUMENTS 5,061,922 A * 10/1991 Nishijima ............ G08B 26/002
                                                  340/9.1
5,519,706 A *  5/1996 Bantz .................... H04L 9/0844
                                                  455/435.2
(Continued)

FOREIGN PATENT DOCUMENTS

EP       1777895 A1    4/2007
JP    2006-019851 A    1/2006
(Continued)

OTHER PUBLICATIONS

Japan Patent Office, Office Action issued in Japanese Patent Application No. JP 2012-019088, mailed Dec. 8, 2015.

*Primary Examiner* — Jason D Recek
*Assistant Examiner* — Golam Mahmud
(74) *Attorney, Agent, or Firm* — Baker Botts L.L.P.

(57) ABSTRACT

A communication apparatus includes a processor and a memory. The processor executes computer-readable instructions stored in the memory. The instructions instruct the communication apparatus to establish a first network including the communication apparatus and a first device. The instructions instruct the communication apparatus to establish a second network including the communication apparatus and a second device. The instructions instruct the communication apparatus to determine a target IP address. Determining the target IP address includes identifying a particular IP address, which is an IP address of the communication apparatus used in the second type network. Determining the target IP address includes generating the target IP address to be within a particular range using the particular IP
(Continued)

address. The particular range is a range of IP addresses that are not available in the second type network. The instructions instruct the communication apparatus to assign the target IP address to the first device.

16 Claims, 10 Drawing Sheets

Related U.S. Application Data continuation of application No. 17/238,467, filed on Apr. 23, 2021, now Pat. No. 11,595,344, which is a continuation of application No. 16/850,598, filed on Apr. 16, 2020, now Pat. No. 11,012,286, which is a continuation of application No. 16/135,509, filed on Sep. 19, 2018, now Pat. No. 10,659,282, which is a continuation of application No. 15/723,427, filed on Oct. 3, 2017, now Pat. No. 10,110,414, which is a continuation of application No. 13/745,217, filed on Jan. 18, 2013, now Pat. No. 9,794,108.

(51) Int. Cl.
  *H04L 12/66* (2006.01)
  *H04L 29/12* (2006.01)
  *H04L 61/00* (2022.01)
  *H04L 61/5014* (2022.01)
  *H04L 61/5038* (2022.01)
  *H04L 61/5046* (2022.01)
  *H04L 61/5061* (2022.01)

(56) References Cited

U.S. PATENT DOCUMENTS

| | | | | |
|---|---|---|---|---|
| 6,058,421 A * | 5/2000 | Fijolek | ............... | H04L 12/2801 370/312 |
| 6,496,867 B1 * | 12/2002 | Beser | ............... | H04L 61/35 709/227 |
| 7,395,354 B2 * | 7/2008 | Keane | ............... | H04L 61/2535 709/245 |
| 7,729,324 B2 * | 6/2010 | Kachi | ............... | H04W 48/02 370/245 |
| 8,386,603 B2 * | 2/2013 | Arashin | ............... | H04L 61/5014 709/224 |
| 8,396,946 B1 * | 3/2013 | Brandwine | ............... | H04L 41/0895 709/224 |
| 8,560,833 B2 * | 10/2013 | Kumar | ............... | H04L 63/168 713/151 |
| 8,661,099 B2 * | 2/2014 | Ohara | ............... | H04L 61/5092 709/222 |
| 8,688,994 B2 * | 4/2014 | Alkhatib | ............... | H04L 63/0815 370/254 |
| 8,886,776 B2 * | 11/2014 | Ishimoto | ............... | H04L 61/103 709/221 |
| 8,892,724 B1 * | 11/2014 | Bertz | ............... | H04L 61/2517 709/224 |
| 9,009,327 B2 * | 4/2015 | Adhya | ............... | H04L 61/5007 709/227 |
| 9,036,504 B1 * | 5/2015 | Miller | ............... | H04L 45/586 370/254 |
| 9,100,303 B2 * | 8/2015 | Li | ............... | H04L 61/5046 |
| 9,237,175 B2 * | 1/2016 | Wang | ............... | H04L 65/61 |
| 9,288,668 B2 * | 3/2016 | Kim | ............... | H04W 8/26 |
| 2002/0114317 A1 * | 8/2002 | Dorenbosch | ............... | H04W 76/10 370/321 |
| 2004/0054799 A1 * | 3/2004 | Meier | ............... | H04L 61/00 709/230 |
| 2004/0170181 A1 * | 9/2004 | Bogdon | ............... | H04L 12/5692 370/395.42 |
| 2005/0163078 A1 * | 7/2005 | Oba | ............... | H04W 12/062 370/331 |
| 2006/0002324 A1 * | 1/2006 | Babbar | ............... | H04L 61/5092 370/325 |
| 2006/0018325 A1 * | 1/2006 | Conrad | ............... | H04L 61/35 370/395.52 |
| 2006/0221955 A1 * | 10/2006 | Enright | ............... | H04L 61/2535 370/389 |
| 2007/0104092 A1 * | 5/2007 | Chen | ............... | H04L 12/5602 370/218 |
| 2007/0177560 A1 * | 8/2007 | Swartz | ............... | G06Q 30/06 370/338 |
| 2008/0095080 A1 * | 4/2008 | Danzeisen | ............... | H04L 61/00 370/277 |
| 2008/0198870 A1 * | 8/2008 | Brodersen | ............... | H04L 12/5692 370/465 |
| 2009/0046684 A1 | 2/2009 | Yamamoto | | |
| 2010/0272083 A1 * | 10/2010 | Itoh | ............... | H04W 24/02 370/338 |
| 2010/0272107 A1 * | 10/2010 | Papp | ............... | H04L 61/103 370/392 |
| 2011/0149816 A1 | 6/2011 | Saito et al. | | |
| 2011/0153815 A1 | 6/2011 | Aoki | | |
| 2011/0167475 A1 * | 7/2011 | Hoover | ............... | H04L 67/63 726/3 |
| 2011/0238800 A1 * | 9/2011 | Ishimoto | ............... | H04L 61/4511 709/221 |
| 2011/0242983 A1 * | 10/2011 | Saito | ............... | H04L 69/18 370/241 |
| 2013/0103833 A1 * | 4/2013 | Ringland | ............... | H04W 8/087 709/224 |
| 2013/0182651 A1 * | 7/2013 | Kelkar | ............... | H04L 61/5038 370/329 |
| 2017/0339631 A1 * | 11/2017 | Pugaczewski | ............... | H04W 12/06 |

FOREIGN PATENT DOCUMENTS

| | | |
|---|---|---|
| JP | 2008-259162 A | 10/2008 |
| JP | 2009-049576 A | 3/2009 |
| JP | 2010-239281 A | 10/2010 |
| JP | 2011-077596 A | 4/2011 |
| JP | 2011-130205 A | 6/2011 |
| JP | 2011-135166 A | 7/2011 |

* cited by examiner

Fig.1
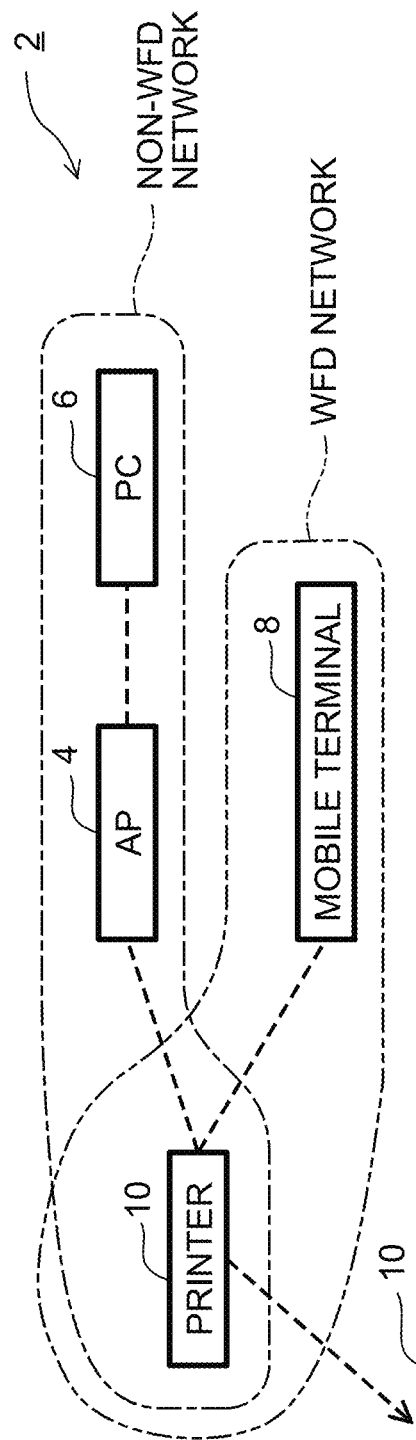
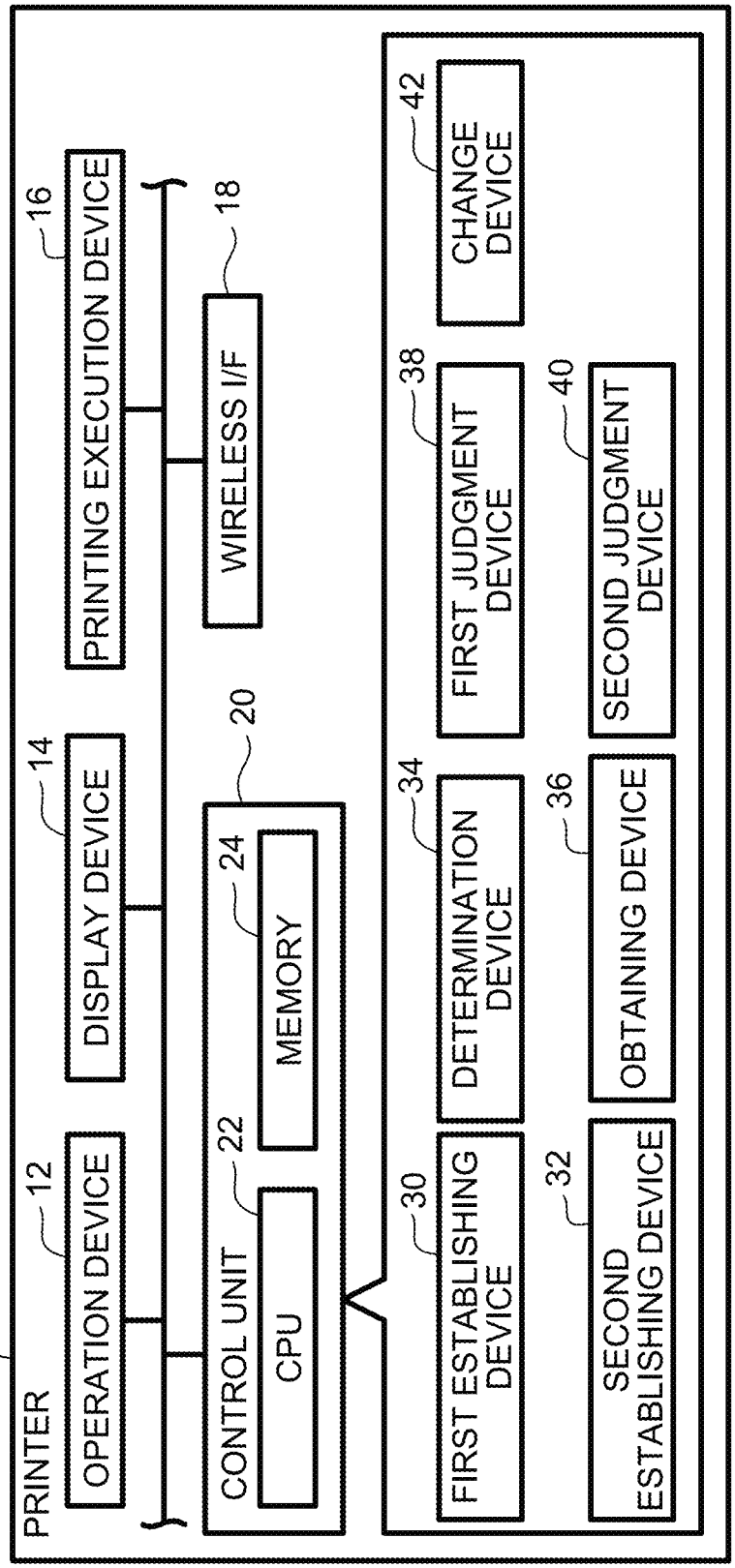

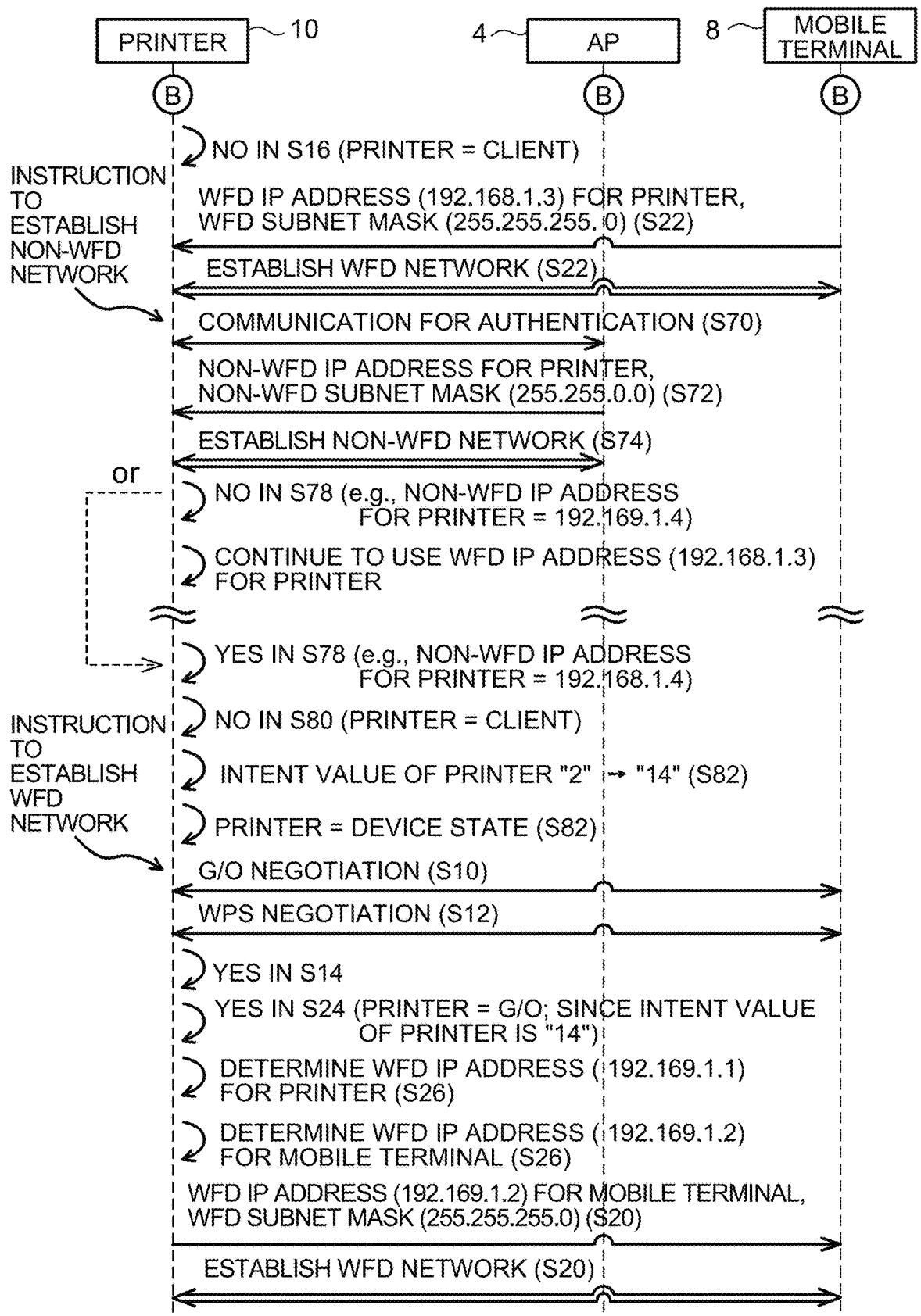

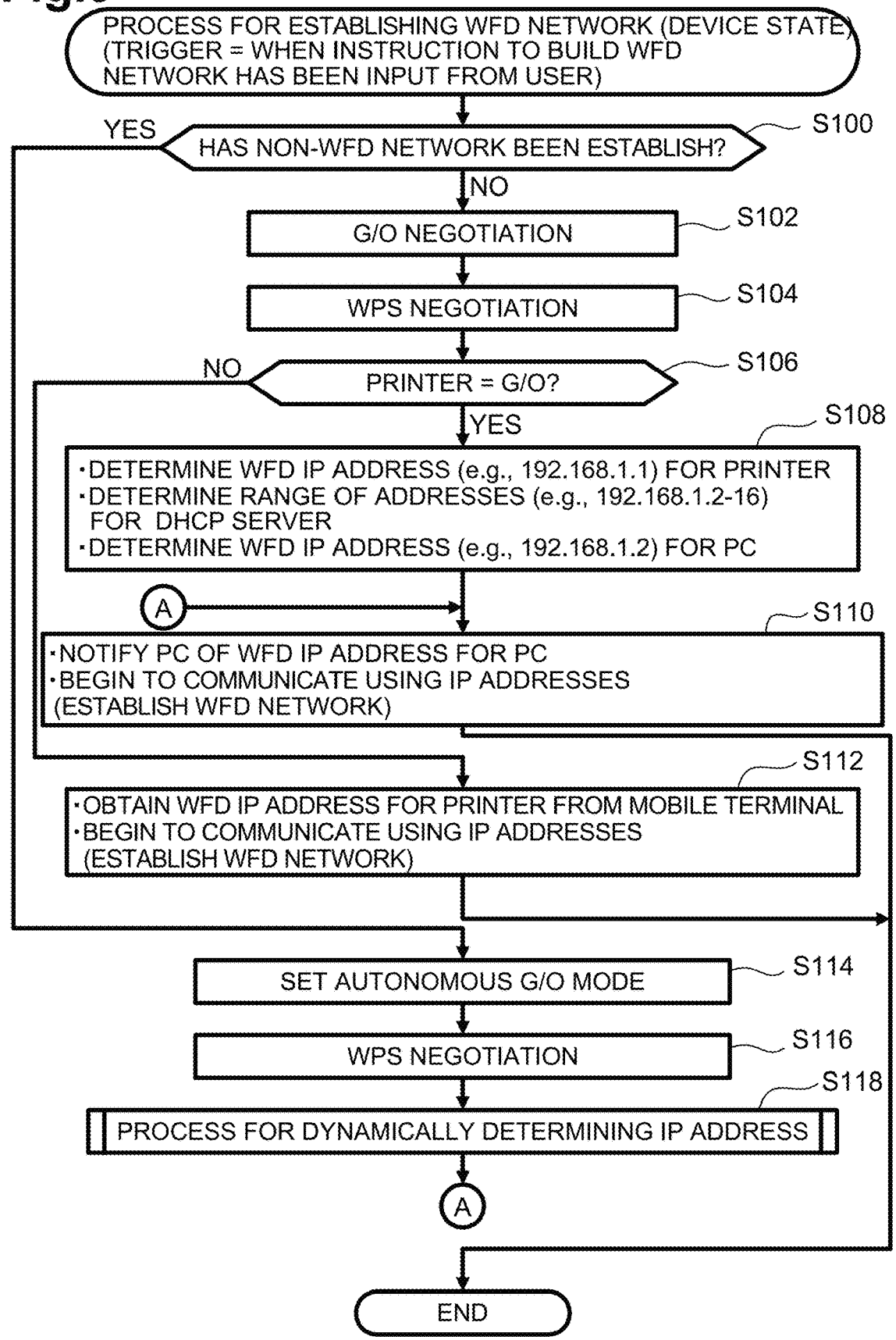

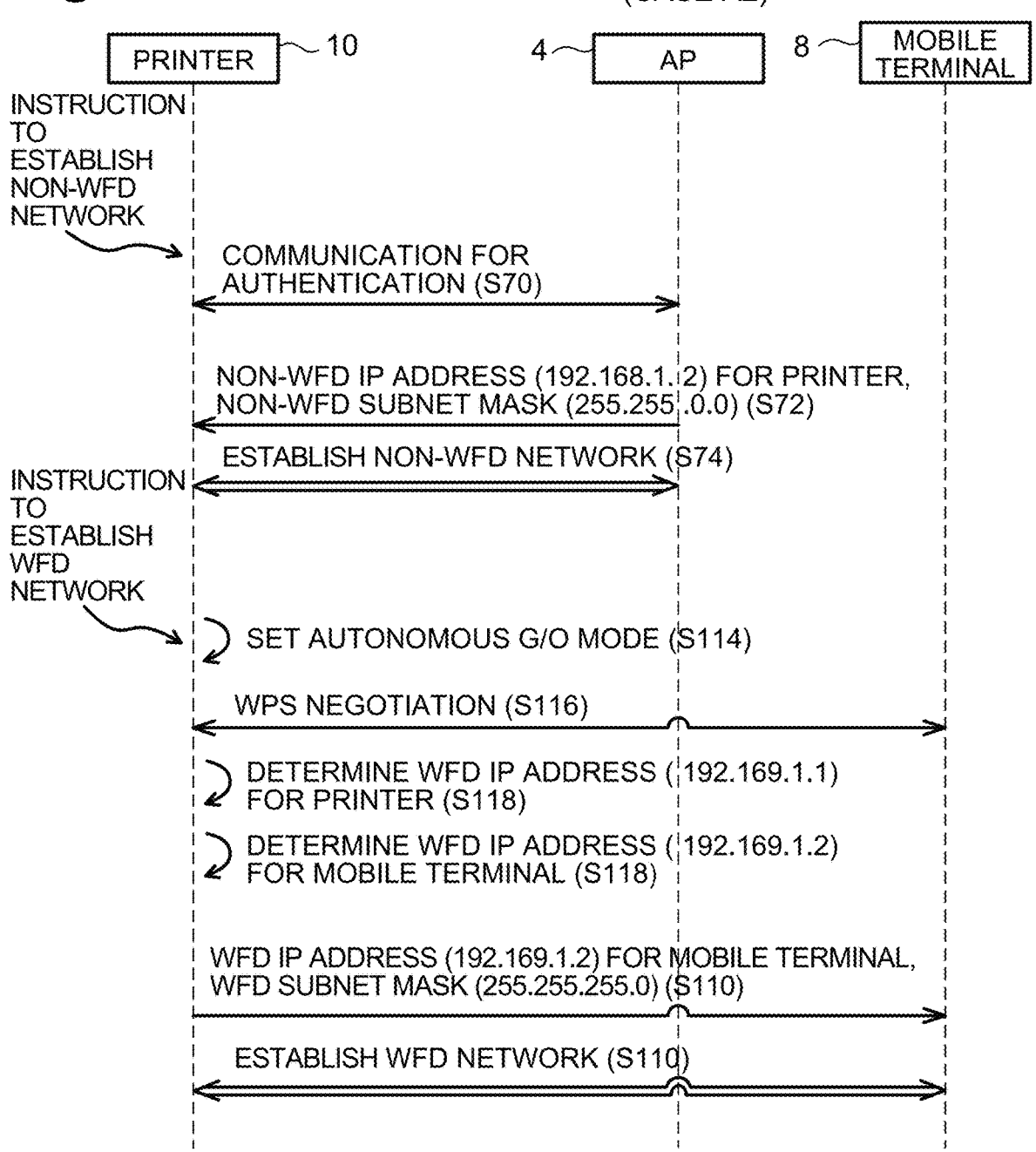

COMMUNICATION APPARATUS, METHODS, AND NON-TRANSITORY COMPUTER-READABLE MEDIA FOR DETERMINING IP ADDRESSES FOR USE IN DIFFERENT NETWORKS

CROSS-REFERENCE TO RELATED APPLICATIONS

This application is a continuation of U.S. patent application Ser. No. 18/156,773, filed on Jan. 19, 2023; which is a continuation of U.S. patent application Ser. No. 17/238,467, filed on Apr. 23, 2021, now U.S. Pat. No. 11,595,344 B2, issued on Feb. 28, 2023; which is a continuation of U.S. patent application Ser. No. 16/850,598, filed on Apr. 16, 2020, now U.S. Pat. No. 11,012,286 B2, issued on May 18, 2021; which is a continuation of U.S. patent application Ser. No. 16/135,509, filed on Sep. 19, 2018, now U.S. Pat. No. 10,659,282 B2, issued on May 19, 2020; which is a continuation of U.S. patent application Ser. No. 15/723,427, filed on Oct. 3, 2017, now U.S. Pat. No. 10,110,414 B2, issued on Oct. 23, 2018; which is a continuation of U.S. patent application Ser. No. 13/745,217, filed on Jan. 18, 2013, now U.S. Pat. No. 9,794,108 B2, issued on Oct. 17, 2017; which claims priority to and the benefit of Japanese Patent Application No. 2012-019088, filed on Jan. 31, 2012. The disclosures of each of which are incorporated herein by reference in their entirety.

BACKGROUND OF THE INVENTION

1. Field of the Invention

The invention disclosed herein relates generally to network communication and more specifically to communication apparatus, methods, and non-transitory computer-readable media for determining IP addresses for use in different networks.

2. Description of Related Art

A known system includes a wireless access point connected to two wireless local area network ("LAN") cards, a first notebook personal computer ("PC") connected to one of the wireless LAN cards, and a second notebook PC connected to the other one of the wireless LAN cards. An Internet Protocol ("IP") address including a subnet address assigned to the one of the wireless LAN cards is assigned to the first notebook PC from a Dynamic Host Configuration Protocol ("DHCP") server on an intranet. An IP address including a subnet address assigned to the other wireless LAN card is assigned to the second notebook PC from a DHCP server in the wireless access point. As a result, the first notebook PC and the second notebook PC belong to different subnetworks.

SUMMARY OF THE INVENTION

Aspects of the disclosure may provide a technology that may enable proper execution of communication between a communication apparatus and a first device and communication between the communication apparatus and a second device by dynamically determining a target IP address to be assigned to the first device by the communication apparatus.

A communication apparatus disclosed herein may include a processor and a memory. The memory may be configured to store computer-readable instructions therein. The processor may execute the computer-readable instructions, which may instruct the communication apparatus to perform various processes in accordance therewith. In particular, the computer-readable instructions may instruct the communication apparatus to establish a first type network including the communication apparatus and a first device. Further, the computer-readable instructions may instruct the communication apparatus to establish a second type network including the communication apparatus and a second device. In addition, the computer-readable instructions may instruct the communication apparatus to determine a target IP address for the first device in response to satisfaction of a first condition. The process of determining the target IP address may include a process of identifying a particular IP address. The particular IP address may be an IP address of the communication apparatus used in the second type network. The process of determining the target IP address may further include generating the target IP address to be within a particular range using the particular IP address. The particular range may be a range of IP addresses that may not be available in the second type network. Moreover, the computer-readable instructions may instruct the communication apparatus to assign the target IP address to the first device.

According to particular configurations, under a particular condition, the communication apparatus may determine an IP address (e.g., a target IP address) for a first device that is not included in a particular address range, which may be a range of IP addresses not available in a second type network, by referring to an IP address (e.g., a particular IP address) for a communication apparatus used in the second type network. Consequently, the communication apparatus may dynamically determine the target IP address that is included in the particular address range in accordance with the particular IP address and may assign the target IP address to the first device. Therefore, for example, the communication apparatus may properly transmit data to the first device when the data is to be transmitted to the first device using the target IP address as a destination. Accordingly, the communication apparatus may properly execute communication.

A control method, computer-executable instructions, and a non-transitory computer-readable recording medium storing the computer-executable instructions, each of which may realize the above-disclosed functions of the communication apparatus also are disclosed herein.

For example, a computer-readable storage medium disclosed herein may store computer-readable instructions therein. When executed by the processor of a communication apparatus, the computer-readable instructions may instruct the communication apparatus to perform various processes in accordance therewith. In particular, the computer-readable instructions may instruct the communication apparatus to establish a first type network including the communication apparatus and a first device. Further, the computer-readable instructions may instruct the communication apparatus to establish a second type network including the communication apparatus and a second device. In addition, the computer-readable instructions may instruct the communication apparatus to determine a target IP address for the first device in response to satisfaction of a first condition. The process of determining the target IP address may include a process of identifying a particular IP address. The particular IP address may be an IP address of the communication apparatus used in the second type network. The process of determining the target IP address may further include generating the target IP address to be within a particular range using the particular IP address. The particular range may be a range of IP addresses that may not be available in the second type network. Moreover, the computer-readable instructions may instruct the communication apparatus to assign the target IP address to the first device.

In addition, a communication apparatus disclosed herein may include various devices therein. In particular, the communication apparatus may include a first establishing device that may establish a first type network including the communication apparatus and a first device. Further, the communication apparatus may include a second establishing device that may establish a second type network including the communication apparatus and a second device. In addition, the communication apparatus may include a determining device that may determine a target IP address for the first device in response to satisfaction of a first condition. The determining device may include an identifying portion that may identify a particular IP address. The particular IP address may be an IP address of the communication apparatus used in the second type network. The determining device also may include a generating portion that may generate the target IP address to be within a particular range using the particular IP address. The particular range may be a range of IP addresses that are not available in the second type network. Moreover, the communication apparatus may include an assigning device that may assign the target IP address to the first device.

Other objects, features, and advantages will be apparent to persons of ordinary skill in the art from the following detailed description of the disclosure and the accompanying drawings.

BRIEF DESCRIPTION OF THE DRAWINGS

For a more complete understanding of the present disclosure, needs satisfied thereby, and the objects, features, and advantages thereof, reference now is made to the following descriptions taken in connection with the accompanying drawings.

FIG. 1 is a block diagram showing particular configurations of a communication system.

FIG. 8 is a diagram that shows a sequence of further processes that may occur in the Case B.

FIG. 9 is a flowchart that shows a process of establishing a WFD network according to some configurations of a communication system.

FIG. 10 is a diagram that shows a sequence of processes that may occur in a Case A2.

DETAILED DESCRIPTION OF EMBODIMENTS OF THE INVENTION

Figure 2:
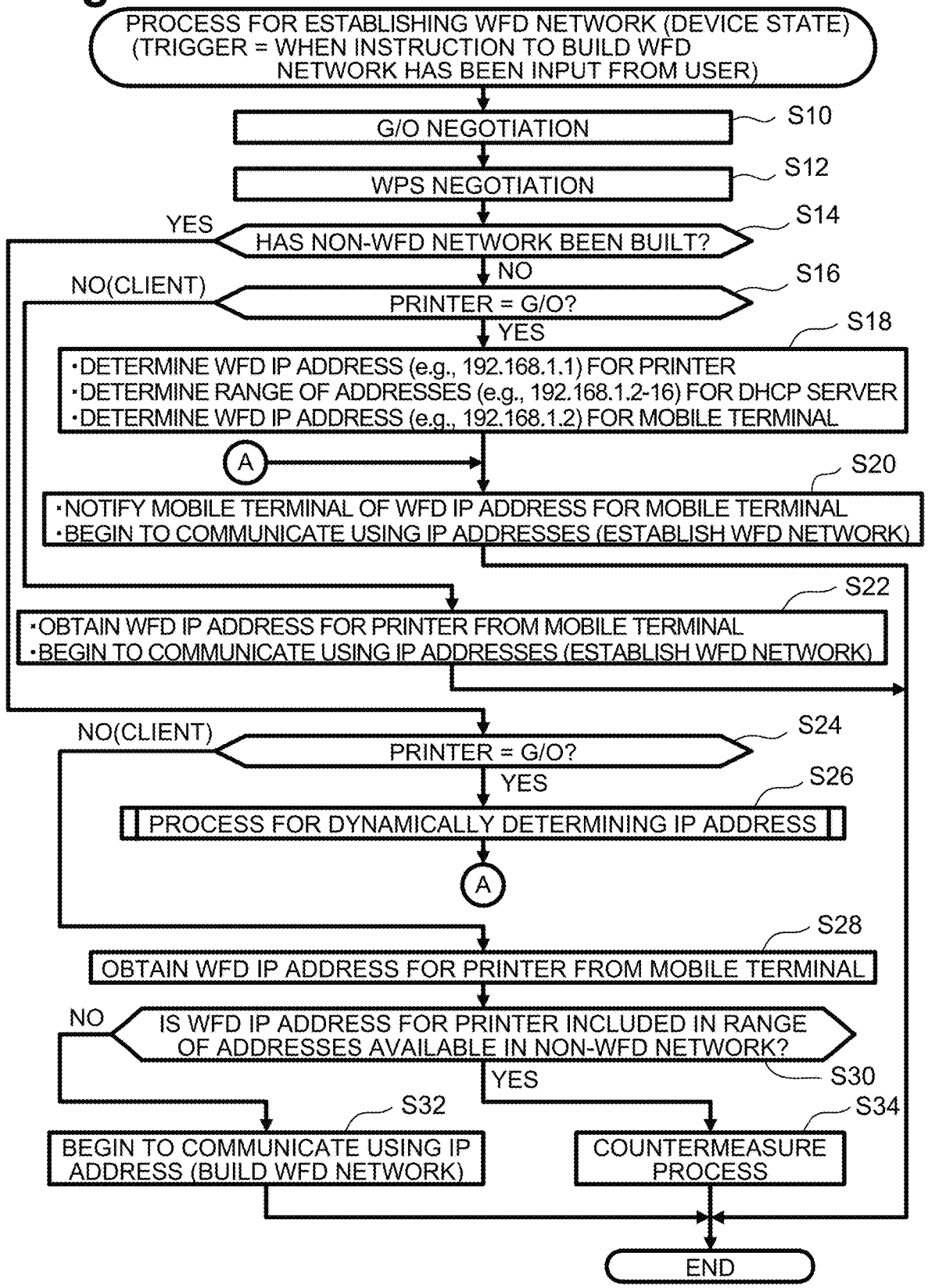
FIG. 2 is a flowchart showing a process of establishing a Wi-Fi Direct ("WFD") network.

Particular embodiments now are disclosed. As shown in FIG. 1, a communication system 2 may comprise an access point ("AP") 4, a PC 6, a mobile terminal 8, and a printer 10 (e.g., a peripheral device of the PC 6, the mobile terminal 8, and the like). The mobile terminal 8 and the printer 10 may each may execute a wireless communication function complying with the Wi-Fi Direct™ ("WFD") standard, which will be described below (Wi-Fi Direct™ is a certification mark owned by the Wi-Fi Alliance of Austin, Texas). A connection complying with the WFD standard may be referred to as a "WFD connection." The printer 10 may establish a WFD connection to the mobile terminal 8, and, accordingly, a WFD network may be established. Thus, the mobile terminal 8 and the printer 10 may execute wireless communication of target data, such as print data.

In addition to the wireless communication function according to WFD, the printer 10 may execute a normal wireless communication function (e.g., wireless communication that complies with the 802.11 standard defined by the Institute of Electrical and Electronics Engineers ("IEEE")). Accordingly, the printer 10 may establish a non-WFD connection (e.g., a connection that does not comply with the WFD standard) to the AP 4, and, accordingly, a non-WFD network may be established. The PC 6 also may establish a non-WFD connection to the AP 4 (e.g., a Wi-Fi connection with AP 4). Thus, the printer 10 and the PC 6 may execute wireless communication of target data, such as print data, through the AP 4.

In particular configurations, the AP 4, the PC 6, and the printer 10 may be, for example, disposed in a particular location. Accordingly, in the particular location, a non-WFD network comprising the AP 4, the PC 6, and the printer 10 may be established. Therefore, an input (e.g., via a worker in the particular location) through the PC 6 may cause the printer 10 to execute printing through the AP 4. In addition, for example, an input (e.g., via a visitor to the particular location) through a mobile terminal 8 may temporarily establish a WFD connection between the mobile terminal 8 and the printer 10. Accordingly, the mobile terminal 8 may be used to temporarily establish a WFD network comprising the mobile terminal 8 and the printer 10. Therefore, the mobile terminal 8 may be used to cause the printer 10 to execute printing without using the AP 4. Thus, in particular configurations, the non-WFD network may be an enduring network established for long-term use and the WFD network may be a temporary network established for temporary use.

The printer 10 may comprise an operation device 12, a display device 14, a printing execution device 16, a wireless interface 18, and a control device 20. The devices 12, 14, 16, 18, and 20 may be connected to a bus line (reference numeral omitted). The operation device 12 may comprise a plurality of keys. Various instructions may be input to the printer 10 by operating the operation device 12. The display device 14 may be a display for displaying various pieces of information. The printing execution device 16 may comprise a printing mechanism adopting, for example, an inkjet method, a laser method, or another method, and may execute printing in accordance with an instruction from the control device 20.

The wireless interface 18 may be an interface used by the control device 20 to execute wireless communication. The wireless interface 18 may be physically a single interface. However, both a media access control ("MAC") address to be used for a WFD connection and a MAC address to be used for a non-WFD connection may be assigned to the wireless interface 18. Therefore, the control device 20 may simultaneously execute both the wireless communication function according to WFD and the normal wireless communication function using the wireless interface 18. Accordingly, the control device 20 may produce a scenario in which both a WFD network and a non-WFD network have been established, which is described in detail below.

The control device 20 may comprise a central processing unit ("CPU") 22 and a memory 24. The CPU 22 may execute various processes in accordance with programs stored in the memory 24. The memory 24 may comprise a read-only memory ("ROM"), a random-access memory ("RAM"), a hard disk, or other storage components. The memory 24 may store the computer-readable instructions to be executed by the CPU 22 and data obtained or generated while the CPU 22 is executing processes. By performing various processes when executing such computer-readable instructions, CPU 22 may function as various devices, such as devices 30, 32, 34, 36, 38, 40, and 42, which are described in detail below.

The AP 4 may relay wireless communication between devices (e.g., the PC 6 and the printer 10) comprised in the non-WFD network. Furthermore, the AP 4 may function as a DHCP server that may assign IP addresses to such devices in the non-WFD network. The AP 4 may determine an IP address for the printer 10 to be used in the non-WFD network ("non-WFD IP address for the printer 10") and may assign the non-WFD IP address for the printer 10 to the printer 10. Similarly, the AP 4 may assign a non-WFD IP address for the PC 6 to the PC 6. Thus, the printer 10 may function as a second establishing device 32 and may execute communication of print data or other data with the PC 6 using the non-WFD IP address for the printer 10 assigned from the AP 4, the IP address for the AP 4, and the IP address for the PC 6. Thus, in particular configurations, establishing a non-WFD network comprising the AP 4, the PC 6, and the printer 10 may permit communication using IP addresses. In the non-WFD network, IP addresses that comply with the Internet Protocol version 4 ("IPv4") standard defined by the Internet Engineering Task Force ("IETF") may be used.

The PC 6 may establish a non-WFD connection to the AP 4. The PC 6 may comprise a CPU, a memory, a display, and other components (not shown). The memory of the PC 6 may store a printer driver program (e.g., computer-readable instructions for controlling a printer) for the printer 10. The CPU of the PC 6 may generate print data to be printed using the printer driver program. When a non-WFD connection has been established between the printer 10 and the AP 4 and a non-WFD connection has been established between the PC 6 and the AP 4, the PC 6 may wirelessly transmit the print data to the printer 10 through the AP 4.

The mobile terminal 8 may be a portable terminal and may be, for example, a smartphone, a personal digital assistant ("PDA"), a notebook PC, a tablet PC, or other terminal device. The mobile terminal 8 may execute the wireless communication function complying with the WFD standard. The mobile terminal 8 may establish a WFD connection to the printer 10. The mobile terminal 8 may comprise a CPU, a memory, a display, and other components (not shown). The memory of the mobile terminal 8 may store a printer driver program for the printer 10. The CPU of the mobile terminal 8 may generate print data to be printed using the printer driver program. When a WFD connection has been established between the printer 10 and the mobile terminal 8, the mobile terminal 8 may wirelessly transmit the print data to the printer 10 without using the AP 4.

As noted above, WFD is a standard defined by the Wi-Fi Alliance. The WFD standard is described in "Wi-Fi Peer-to-Peer (P2P) Technical Specification Version 1.1" created by the Wi-Fi Alliance.

As disclosed above, the printer 10 and the mobile terminal 8 may each execute wireless communication that complies with the WFD standard. A device that may execute wireless communication that complies with the WFD standard is referred to as a "WFD-enabled device" hereinafter. In the WFD standard, three states, namely a Group Owner state ("G/O state"), a client state, and a device state, are defined as the states of a WFD-enabled device. The WFD-enabled device may selectively operate in one of the three states.

A device in the G/O state and a device in the client state may constitute a single WFD network. In a single WFD network, the number of devices in the G/O state is invariably one, but the number of devices in the client state may be one or more. The device in the G/O state may control the one or more devices in the client state. More specifically, the device in the G/O state may generate a control list in which identification information (e.g., a MAC address) regarding each of the one or more devices in the client state may be described. When a device in the client state has newly joined the WFD network, the device in the G/O state may add identification information regarding the device to the control list. When a device in the client state has left the WFD network, the device in the G/O state may delete identification information regarding the device from the control list.

The device in the G/O state may execute wireless communication of target data (e.g., data, such as print data or other data, comprising information in the network layer of the Open Systems Interconnection ("OSI") reference model created by the International Organization for Standardization ("ISO")) with a device registered in the control list (e.g., a device in the client list). Although the device in the G/O state may execute wireless communication of data (e.g., data that does not comprise information in the network layer, such as data in the physical layer, which may comprise, for example, a probe request signal or a probe response signal) associated with joining the WFD network with a device that has not been registered in the control list, the device in the G/O state may not execute wireless communication of the target data with such a device. For example, the printer 10 in the G/O state may wirelessly receive print data from the mobile terminal 8 (e.g., the mobile terminal 8 in the client state) registered in the control list, but the printer 10 in the G/O state may not receive print data from a device that has not been registered to the control list.

In addition, the device in the G/O state may relay wireless communication of target data (e.g., print data or other data) between a plurality of devices in the client state. For example, when the mobile terminal 8 in the client state is to wirelessly transmit print data to another printer in the client state, the mobile terminal 8 may wirelessly transmit the print data to the printer 10 in the G/O state. In response to such transmission, the printer 10 may wirelessly receive print data from the mobile terminal 8 and may wirelessly transmit the print data to the other printer. Accordingly, a device in the G/O state may function as an AP in a wireless network.

Furthermore, a device in the G/O state may function as a DHCP server that may assign an IP address to a device in the client state. For example, the printer 10 in the G/O state may determine an IP address for the printer 10 to be used in the WFD network ("WFD IP address for the printer 10"). Further, the printer 10 in the G/O state may determine an IP address for the mobile terminal 8 in the client state ("WFD IP address for the mobile terminal 8"), and may assign the WFD IP address for the mobile terminal 8 to the mobile terminal 8. In doing so, the printer 10 may execute communication of print data or other data with the mobile terminal 8 using the WFD IP address for the printer 10 and the WFD IP address for the mobile terminal 8. Thus, in particular configurations, establishing a WFD network comprising the mobile terminal 8 and the printer 10 may correspond to beginning communication using IP addresses. In the WFD network, IP addresses according to the IPv4 standard may be used.

A WFD-enabled device (e.g., a device that has not been registered to the control list) that has not joined a WFD network may be a device in the device state. A device in the device state may execute wireless communication of data (e.g., data in the physical layer, such as a probe request signal or a probe response signal, or other data) for joining the WFD network, but the device in the device state may not execute wireless communication of target data (e.g., print data or other data) through the WFD network.

A process of establishing a WFD network executed by the printer 10 is described with reference to FIG. 2. When a predetermined instruction to build a WFD network is input to the operation device 12, the control device 20 may begin the process of establishing a WFD network shown in FIG. 2.

Although not shown in FIG. 2, when the instruction to build a WFD network has been input to the printer 10, a first establishing device 30 may execute a search process of searching for devices in the device state (e.g., the mobile terminal 8) around the printer 10. Furthermore, the first establishing device 30 may control the display device 14 to display a device list comprising information (e.g., the names of the devices, the names of models, MAC addresses, or other information) regarding the devices found in the search process. An input to the printer 10 may specify, in the device list, a device with which a connection to the printer 10 is to be established. The first establishing device 30 may select the device in accordance with an input instruction. In the following example discussion, it may be assumed that the mobile terminal 8 has been selected, although other devices may be selected.

When an instruction to build a WFD network has been input to the mobile terminal 8, the mobile terminal 8 may execute the search process for the printer 10. Therefore, a device list comprising information regarding the printer 10 may be displayed on the display of the mobile terminal 8. A device with which a connection to the mobile terminal 8 is to be established may be selected from the device list on the mobile terminal 8. In the following example discussion, it may be assumed that the printer 10 has been selected, although other devices may be selected In Step S10, the first establishing device 30 may execute G/O negotiation to determine one of the printer 10 and the mobile terminal 8 to be set to a G/O state and the other of the printer 10 and the mobile terminal 8 to be set to a client state. More specifically, a first establishing device 30 may transmit an intent value of the printer 10 saved to the memory 24 to the mobile terminal 8. In addition, the first establishing device 30 may receive an intent value of the mobile terminal 8 saved to the mobile terminal 8 from the mobile terminal 8. The intent value may be a setting value indicating the suitability of a device for the G/O state. The intent value may be, for example, a value in a value range of 0 to 15. The greater the intent value, the greater the suitability for the G/O. Conversely, the less the intent value, the more likely the device is to become a client.

For example, a device (e.g., a PC), whose CPU and memory are of the high performance type, may operate as a G/O while executing another process at a high speed. Therefore, a relatively large intent value normally may be set for such a device, such that the device may likely be set to the G/O state. Conversely, for example, a device whose CPU and memory have relatively low performance might not be able to operate as a G/O while executing another process at high speed. Therefore, a relatively small intent value generally may be set for such a device, such that the device may be unlikely to be set to the G/O state (e.g., the device may likely be set to the client state).

In the present example configurations, a value of "2" may be set as the intent value (e.g., the default intent value) of the printer 10. The CPU and the memory of the printer 10 generally may have low performance compared to those of a PC 6 or other devices. Therefore, a relatively small default intent value may be set for the printer 10. Consequently, in Step S10, the first establishing device 30 normally may transmit the intent value of "2" for the printer 10 to the mobile terminal 8. Nevertheless, when Step S34 (shown in FIG. 2) or Step S82 (shown in FIG. 4) has been executed, the intent value of the printer 10 may be changed from 2 to 14, for example, which is described below in detail. Therefore, when Step S10 follows immediately after Step S34 or Step S82 is executed, the first establishing device 30 may transmit the intent value of "14" for the printer 10 to the mobile terminal 8.

Furthermore, in Step S10, the first establishing device 30 may compare the intent value of the printer 10 and the intent value of the mobile terminal 8, and may determine a device to be set to a G/O state and another device to be set to a client state. For example, when the intent value of the printer 10 is greater than the intent value of the mobile terminal 8, the first establishing device 30 may determine that the printer 10 is to be set to the G/O state and that the mobile terminal 8 is to be set to the client state. On the other hand, for example, when the intent value of the printer 10 is less than the intent value of the mobile terminal 8, the first establishing device 30 may determine that the mobile terminal 8 is to be set to the G/O state and that the printer 10 is to be set to the client state. When the intent value of the printer 10 and the intent value of the mobile terminal 8 are the same, the first establishing device 30 may change the intent value of the printer 10 and may execute the G/O negotiation again using the intent value after the change, or the first establishing device 30 may control the display device 14 to display information indicating that a WFD network may not be established.

In particular configurations, the mobile terminal 8 may determine a G/O device and a client device on the basis of the intent value of the printer 10 and the intent value of the mobile terminal 8 using the same method as the printer 10. When the G/O negotiation in Step S10 has been completed, the process may proceed to Step S12.

In Step S12, the first establishing device 30 may execute a negotiation process complying with the Wi-Fi Protected Setup™ ("WPS") standard to establish a WFD connection to the mobile terminal 8 (Wi-Fi Protected Setup™ is a certification mark owned by the Wi-Fi Alliance of Austin, Texas). When it has been determined that the printer 10 is to be the G/O device, the first establishing device 30 may execute WPS negotiation for the G/O state. Conversely, when it has been determined that the printer 10 is to be the client device, the first establishing device 30 may execute WPS negotiation for the client state.

In the WPS negotiation for the G/O state, the first establishing device 30 may generate data indicating a wireless profile (e.g., a service set identifier ("SSID"), an authentication method, an encryption method, a password, and other information) that may allow a WFD connection to be established. An authentication method and the encryption method may be predetermined. The first establishing device 30 may generate a password in the processing in Step S12. A SSID may be generated by the first establishing device 30 in the processing in Step S12 or the SSID may be predetermined. Subsequently, the first establishing device 30 may transmit the data indicating the wireless profile to the mobile terminal 8.

When the wireless profile has been transmitted from the printer 10 to the mobile terminal 8, the printer 10 and the mobile terminal 8 may use the same wireless profile. The first establishing device 30 may execute wireless communication (hereinafter referred to as the "particular wireless communication") comprising an ausubsequentlytication request, an ausubsequentlytication response, an association request, an association response, and a four-way handshake with the mobile terminal 8 using the wireless profile. In the course of the particular wireless communication, various authentication processes such as authentication of the SSID, authentication of the authentication method and the encryption method, and authentication of the password may be executed. When the authentication has been completed successfully, a WFD connection may be established between the printer 10 and the mobile terminal 8. The first establishing device 30 may add identification information regarding the mobile terminal 8 (e.g., the MAC address of the mobile terminal 8) to the control list.

In the WPS negotiation for the client state, the first establishing device 30 may receive data indicating a wireless profile from the mobile terminal 8. Subsequently, the first establishing device 30 may execute the particular wireless communication with the mobile terminal 8 using the wireless profile. In doing so, a WFD connection may be established between the printer 10 and the mobile terminal 8. The mobile terminal 8 may add identification information regarding the printer 10 (e.g., the MAC address of the printer 10) to the control list. When the WPS negotiation in Step S12 has been completed, the process may proceed to Step S14.

In Step S14, the first establishing device 30 may judge whether a non-WFD network has been established. If a non-WFD network has been established (YES in Step S14), the process may proceed to Step S24, and, if a non-WFD network has not been established (NO in Step S14), the process may proceed to Step S16.

In Step S16, the first establishing device 30 may judge whether the current state of the printer 10 is the G/O state or the client state. If the current state of the printer 10 is the G/O state (YES in Step S16), the process may proceed to Step S18, and, if the current state of the printer 10 is the client state (NO in Step S16), the process may proceed to Step S22.

As described above, the printer 10 in the G/O state functions as a DHCP server. Therefore, in Step S18, a determination device 34 may determine a default IP address (e.g., 192.168.1.1) that may be prepared in advance as the WFD IP address for the printer 10. Furthermore, in Step S18, the determination device 34 may determine a subnet mask to be used in the WFD network ("WFD subnet mask"). The WFD subnet mask may be a default subnet mask (e.g., 255.255.255.0) that may be prepared in advance. Moreover, in Step S18, the determination device 34 may determine the range of IP addresses that may be assigned by the printer 10 as the DHCP server. The address range determined here may be a default address range (e.g., 192.168.1.2-16) that may be prepared in advance. In addition, in Step S18, the determination device 34 may determine a single IP address (e.g., 192.168.1.2) from the address range as the WFD IP address for the mobile terminal 8.

Subsequently, in Step S20, the determination device 34 may notify (e.g., may transmit) the mobile terminal 8 of the WFD IP address for the mobile terminal 8 or the WFD IP address for the printer 10 determined in Step S18 and the WFD subnet mask determined in Step S18. Accordingly, the determination device 34 may assign the WFD IP address for the mobile terminal 8 to the mobile terminal 8. In doing so, the first establishing device 30 may begin to wirelessly communicate with the mobile terminal 8 using the WFD IP address for the printer 10 or the WFD IP address for the mobile terminal 8. That is, the first establishing device 30 establishes a WFD network comprising the mobile terminal 8 and the printer 10. Consequently, the printer 10 (e.g., the first establishing device 30) in the G/O state may execute communication of target data (e.g., print data or other data) comprising data in the network layer, which is a layer superior to the physical layer in the OSI reference model, with the mobile terminal 8 in the client state. The printer 10 (e.g., the first establishing device 30) in the G/O state may relay wireless communication between the mobile terminal 8 in the client state and another device in the client state registered to the control list. When Step S20 has been completed, the process of establishing a WFD network shown in FIG. 2 may end.

If a determination of NO is made in Step S16 (e.g., if the current state of the printer 10 is the client state), the mobile terminal 8 in the G/O state may function as a DHCP server. Therefore, the mobile terminal 8 may determine the WFD IP address for the printer 10 and the WFD subnet mask. In Step S22, an obtaining device 36 may obtain the WFD IP address for the printer 10 or the WFD IP address for the mobile terminal 8 and the WFD subnet mask from the mobile terminal 8. In doing so, the first establishing device 30 may begin to wirelessly communicate with the mobile terminal 8 using the WFD IP address for the printer 10 or the WFD IP address for the mobile terminal 8. That is, the first establishing device 30 may establish a WFD network comprising the mobile terminal 8 and the printer 10. When Step S22 has been completed, the process of establishing a WFD network shown in FIG. 2 may end.

If a determination of YES is made in Step S14 (e.g., if a non-WFD network has been established), the first establishing device 30 may judge in Step S24 whether the current state of the printer 10 is the G/O state or the client state. If the current state of the printer 10 is the G/O state (YES in Step S24), the process may proceed to Step S26, and if the current state of the printer 10 is the client state (NO in Step S24), the process may proceed to Step S28.

Figure 3:
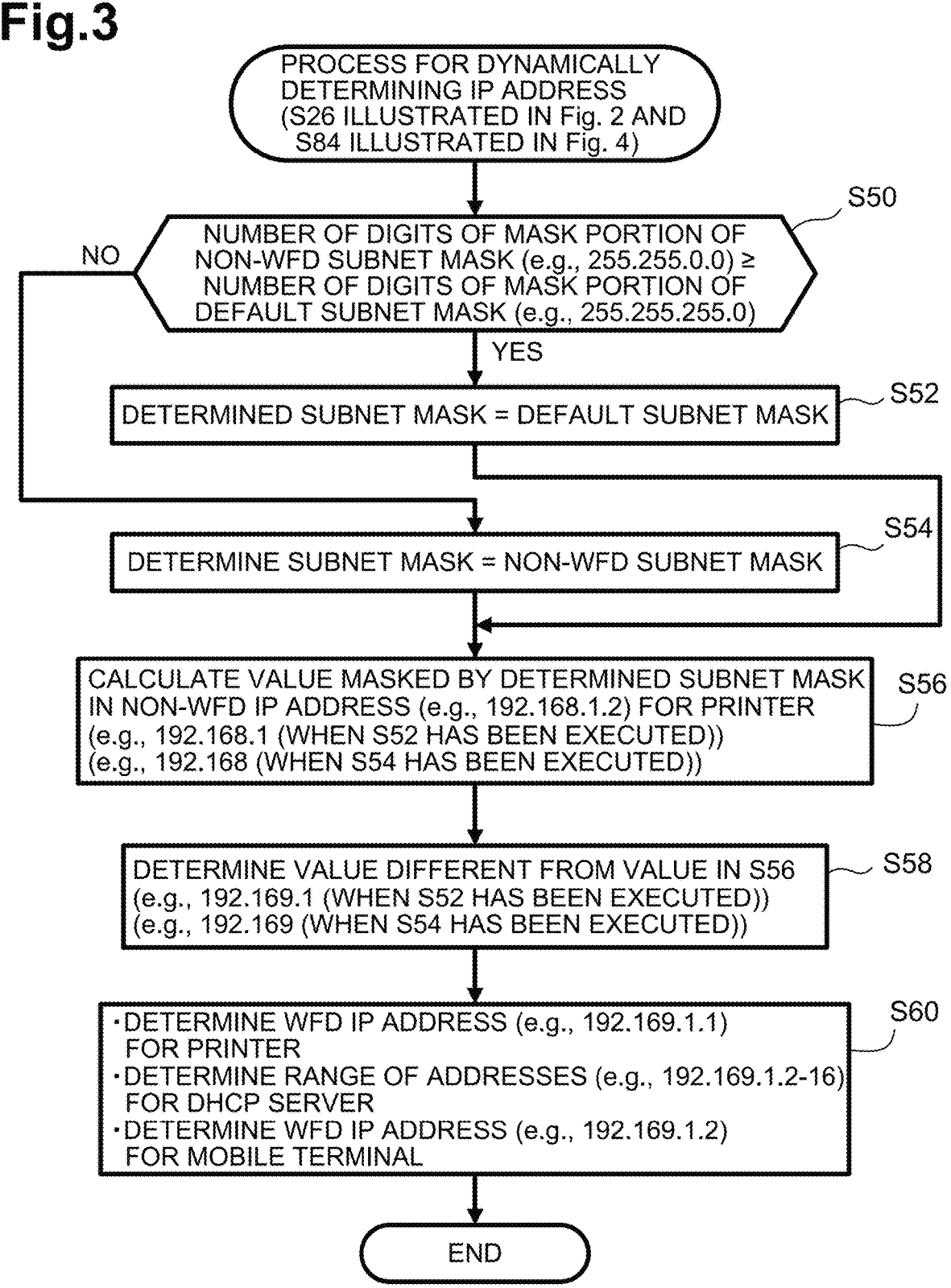
FIG. 3 is a flowchart showing a process of dynamically determining an IP address.

In Step S26, the determination device 34 may execute a process of dynamically determining an IP address. As shown in FIG. 3, in Step S50, the determination device 34 may judge whether or not the number of digits of a mask portion of a subnet mask ("non-WFD subnet mask") that is currently being used in the non-WFD network is equal to or greater than the number of digits of a mask portion of a default subnet mask used in Step S18 shown in FIG. 2. For example, if the non-WFD subnet mask is "255.255.0.0," the number of digits of the mask portion of the non-WFD subnet mask may be a number of digits corresponding to 16 bits (e.g., 255.255). Moreover, for example, if the default subnet mask is "255.255.255.0," the number of digits of the mask portion of the default subnet mask may be a number of digits corresponding to 24 bits (e.g., 255.255.255).

If the number of digits of the mask portion of the non-WFD subnet mask is equal to or greater than the number of digits of the mask portion of the default subnet mask (YES in Step S50), the determination device 34 may determine the default subnet mask as a determined subnet mask in Step S52. If the number of digits of the mask portion of the non-WFD subnet mask is less than the number of digits of the mask portion of the default subnet mask (NO in Step S50), the determination device 34 may determine the non-WFD subnet mask as a determined subnet mask in Step S54. Consequently, in Steps S50, S52, and S54, the determination device 34 may determine a subnet mask, from the non-WFD subnet mask and the default subnet mask, that has a smaller number of digits in the mask portion to be a determined subnet mask.

When Step S52 or Step S54 has been completed, the determination device 34 may calculate, in Step S56, a value masked by the determined subnet mask in the non-WFD IP address for the printer 10 that is currently being used in the non-WFD network. In a first example, the non-WFD IP address for the printer 10 may be "192.168.1.2," and the determined subnet mask determined in Step S52 may be "255.255.255.0." In this case, in Step S56, the determination device 34 may calculate "192.168.1." In a second example, the non-WFD IP address for the printer 10 may be "192.168.1.2," and the determined subnet mask determined in Step S54 may be "255.255.0.0." In this example, in Step S56, the determination device 34 may calculate "192.168."

Subsequently, in Step S58, the determination device 34 may determine a value different from the value calculated in Step S56; however, the value may have the same number of digits as the value calculated in Step S56. In the first example, in Step S58, the determination device 34 may determine, for example, "192.169.1." Although values in the ninth to sixteenth bits may be changed in this example, values in first to eighth bits may be changed (e.g., "193.168.1") or values in seventeenth to twenty-fourth bits may be changed (e.g., "192.168.2") instead. In the second example, in Step S58, the determination device 34 may determine, for example, "192.169." Although values in ninth to sixteenth bits are changed in this example, values in first to eighth bits may be changed (e.g., "193.168") instead.

Subsequently, in Step S60, the determination device 34 may determine an IP address comprising the value calculated in Step S58 as the WFD IP address for the printer 10. In the first example, in Step S60, the determination device 34 may determine, for example, an IP address "192.169.1.1" comprising "192.169." In the second example, in Step S60, the determination device 34 may determine, for example, an IP address "192.169.1.1" comprising "192.162." In Step S60, as in Step S18 shown in FIG. 2, the determination device 34 may determine the default subnet mask (e.g., "255.255.255.0") as the WFD subnet mask. Furthermore, in Step S60, the determination device 34 may determine the range of IP addresses that may be assigned by the printer 10 as the DHCP server. More specifically, the determination device 34 may calculate a network address (e.g., "192.169.1") masked by the default subnet mask in the WFD IP address (e.g., "192.169.1.1") for the printer 10. The determination device 34 subsequently may determine an address range (e.g., "192.169.1.2-16") that may comprise the network address (e.g., "192.169.1") but does not comprise the WFD IP address (e.g., "192.169.1.1") for the printer 10. Moreover, in Step S60, the determination device 34 may determine a single IP address (e.g., "192.169.1.2") in the address range as the WFD IP address for the mobile terminal 8.

A reason why a subnet mask whose number of digits of the mask portion is used as the determined subnet mask in Step S50 to Step S54 shown in FIG. 3 may be demonstrated by example. For example, in some configurations the non-WFD IP address for the printer 10 is "192.168.1.4" and the non-WFD subnet mask is "255.255.255.0." Consequently, the IP address the range of IP addresses available in the non-WFD network may be "192.168.1.1-255." According to the disclosure above, the WFD subnet mask (e.g., the default subnet mask) may be "255.255.0.0."

In the above example, for example, if the printer 10 executes Step S56 and Step S58 using the non-WFD IP address "192.168.1.4" and the non-WFD subnet mask "255.255.255.0," whose number of digits of the mask portion is great, "192.168.1" may be calculated in Step S56 and "192.168.2" may be calculated in Step S58. In this example, the printer 10 may determine, for example, an address range (e.g., "192.168.1-255.1-255"), which may comprise a network address "192.168" masked by the WFD subnet mask "255.255.0.0" and the calculated value "192.168.2," as the range of IP addresses that may be assigned by the printer 10 as the DHCP server. In this example, the range of IP addresses "192.168.1-255.1-255" available in the WFD network and the range of IP addresses "192.168.1.1-255" available in the non-WFD network may overlap. Therefore, an IP address (e.g., "192.168.1.5") comprised in the range of IP addresses "192.168.1.1-255" available in the non-WFD network may be determined as the IP address for the mobile terminal 8. Conversely, the range of IP addresses not available in the non-WFD network may be, for example "1-191.1-168.1-255.1-255," "193-255.1-168.1-255.1-255," "192.1-167.1-255.1-255," and "192.169-255.1-255.1-255." Such IP addresses may comprise network addresses that are not currently assigned to a device in the non-WFD network.

If the above-described event occurs, for example, the printer 10 may not properly identify an appropriate one of the WFD network and the non-WFD network to which the printer 10 is to transmit data when the data is to be transmitted to the mobile terminal 8 using the IP address "192.168.1.5" as the destination. Consequently, data communication may not be properly executed. Moreover, for example, the printer 10 may not properly identify an appropriate network to which the printer 10 is to transmit data when the data is to be transmitted to the PC 6 using an IP address "192.168.1.6" as the destination. Consequently, the data may not be properly transmitted. In order to suppress occurrence of such an event, the printer 10 according to particular configurations may execute an IP address assignment function (e.g., a DHCP server function) using a subnet mask whose number of digits of the mask portion is small as the determined subnet mask, such that the range of IP addresses available in the non-WFD network and the range of IP addresses available in the WFD network do not overlap. Therefore, the printer 10 may properly determine the WFD IP address for the mobile terminal 8 or the WFD IP address for the printer 10. Consequently, the printer 10 may properly transmit data to the mobile terminal 8 using the WFD network and may properly transmit data to the PC 6 through the AP 4 using the non-WFD network.

When Step S60 has been completed, the process of dynamically determining an IP address shown in FIG. 3 (Step S26 shown in FIG. 2) may end. In this case, the process may proceed to Step S20 shown in FIG. 2, and, as disclosed above, the determination device 34 may assign the WFD IP address for the mobile terminal 8 to the mobile terminal 8. Therefore, the first establishing device 30 may begin to communicate with the mobile terminal 8 (e.g., establishes a WFD network) using the WFD IP address for the printer 10 or the WFD IP address for the mobile terminal 8 determined in Step S26. Because the non-WFD network has already been established, a condition in which both the WFD network and the non-WFD network have been established may be formed.

If a determination of No is made in Step S24 shown in FIG. 2 (e.g., if the current state of the printer 10 is the client state), the mobile terminal 8 may function as a DHCP server. Therefore, the determination device 34 may not execute the process of dynamically determining an IP address in Step S26. Consequently, in Step S28, the obtaining device 36 may obtain the WFD IP address for the printer 10 or the WFD IP address for the mobile terminal 8 and the WFD subnet mask from the mobile terminal 8.

Subsequently, in Step S30, a first judgment device 38 may judge whether the WFD IP address for the printer 10 obtained in Step S28 is in the range of IP addresses available in the non-WFD network. More specifically, as shown in Steps S50, S52, and S54 in FIG. 3, the first judgment device 38 may determine a determined subnet mask (e.g., "255.255.0.0"). Subsequently, the first judgment device 38 may calculate a value (e.g., "192.168") of a portion masked by the determined subnet mask in the WFD IP address (e.g., "192.168.1.4") for the printer 10 obtained in Step S28. Moreover, the first judgment device 38 may calculate a value (e.g., "192.168") of a portion masked by the determined subnet mask in the non-WFD IP address (e.g., "192.168.1.2") for the printer 10. If the two calculated values do not match, the first judgment device 38 may judge that the WFD IP address for the printer 10 is not in the above range (NO in Step S30), and the process may proceed to Step S32. If the two calculated values match, the first judgment device 38 may judge that the WFD IP address for the printer 10 is in the above range (YES in Step S30), and the process may proceed to Step S34.

In Step S32, the first establishing device 30 may adopt the WFD IP address for the printer 10 obtained in Step S28 as the IP address for the printer 10 used in the WFD network. Consequently, the first establishing device 30 may begin to communicate with the mobile terminal 8 (e.g., establishes a WFD network) using the WFD IP address for the printer 10 obtained in Step S28. Because the non-WFD network has already been established, a condition in which both the WFD network and the non-WFD network have been established may be formed.

In Step S34, the first establishing device 30 may not adopt the WFD IP address for the printer 10 obtained in Step S28 as the IP address for the printer 10 used in the WFD network. Furthermore, in Step S34, a change device 42 may change the intent value of the printer 10 from 2 to, for example, 14. In some configurations, the change device 42 may change the intent value of the printer 10 to a value different from 14 (e.g., 13, 15, or another value) instead. Thus, it may be sufficient if the change device 42 increases the intent value of the printer 10 from the default intent value "2" (this may also be true for Step S82 shown in FIG. 4, which is described below).

By executing Step S34, "14" may be used as the intent value of the printer 10 in a subsequent G/O negotiation (Step S10). Although not shown in FIG. 2, when the G/O negotiation is executed once after the intent value of the printer 10 is changed from 2 to 14, the change device 42 may reset the intent value of the printer 10 from 14 to 2. Moreover, in Step S34, the first establishing device 30 may change the state of the printer 10 from the client state to the device state. Therefore, the WFD connection (e.g., the WFD connection established by the WPS negotiation in Step S12) between the printer 10 and the mobile terminal 8 may be terminated. As a result, a scenario is created in which the non-WFD network has been established without establishing the WFD network.

In Step S34, the printer 10 may terminate the non-WFD network and may adopt a configuration in which the WFD network has been established. Nevertheless, as disclosed above, the non-WFD network may be an enduring network, and, if such a network is terminated, PC 6 may no longer direct the printer 10 to execute printing. To reduce such occurrences of disruption in the non-WFD network (e.g., termination), a configuration may be adopted in Step S34 in which the non-WFD network that has already been established may be maintained, and the WFD network may not be established. Accordingly, in particular configurations, a configuration may be adopted in which the non-WFD network, which may be an enduring network, takes priority over the WFD network, which may be a temporary network. When Step S34 has been completed, the process of establishing a WFD network shown in FIG. 2 may end.

A process of establishing a non-WFD network executed by the printer 10 now is described with reference to FIG. 4. When a predetermined instruction to establish a non-WFD network is input to the operation device 12, the control device 20 may begin the process of establishing a non-WFD network as shown in FIG. 4.

Figure 4:
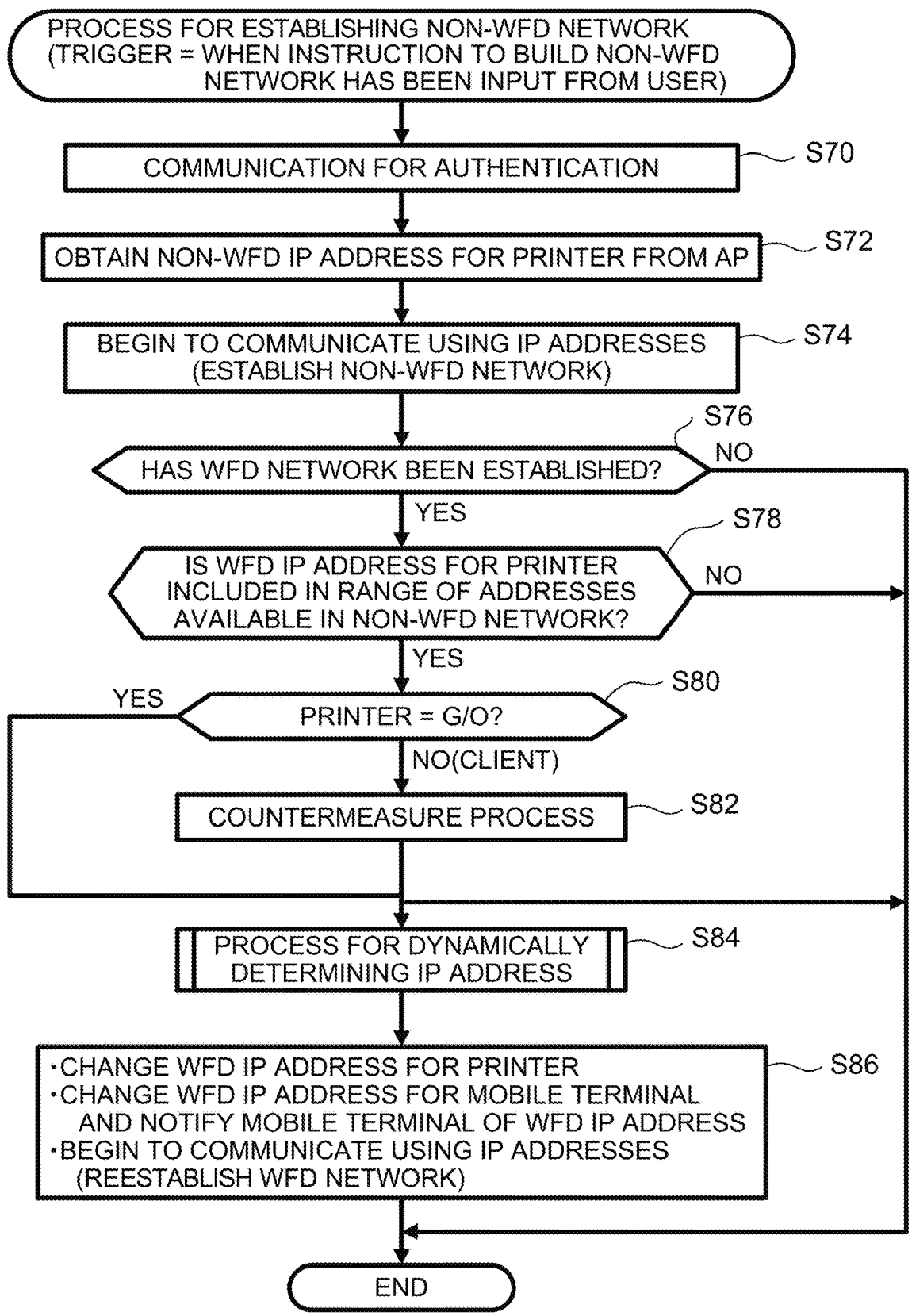
FIG. 4 is a flowchart showing a process of establishing a non-WFD network.

Although not shown in FIG. 4, when the instruction to build a non-WFD network has been input to the printer 10, a second establishing device 32 may execute a scan process of searching for APs existing around the printer 10. Subsequently, the second establishing device 32 may control the display device 14 to display an AP list comprising information (e.g., SSIDs or other information) regarding the APs found by the scan process. An input to the printer 10 may specify, in the AP list, an AP with which a connection to the printer 10 is to be established. The second establishing device 32 may select the AP in accordance with an input instruction. In some examples described below, the AP 4 may be selected.

Unlike the first establishing device 30, the second establishing device 32 may not execute the G/O negotiation. In Step S70, the second establishing device 32 may execute communication for authentication with the AP 4. In such communication, the second establishing device 32 may transmit data regarding an authentication method, an encryption method, a password, or other information to the AP 4. The AP 4 may execute authentication of the authentication method, the encryption method, the password, or other information, and, if the authentication is successful, may transmit data regarding the successful authentication to the printer 10. Thus, a non-WFD connection may be established between the printer 10 and the AP 4.

As described above, in the present embodiment, the AP 4 may function as a DHCP server. The AP 4 may determine the non-WFD IP address for the printer 10 and the non-WFD subnet mask. In Step S72, the second establishing device 32 may obtain the non-WFD IP address for the printer 10 or a non-WFD IP address for the AP 4 and the non-WFD subnet mask from the AP 4.

Subsequently, in Step S74, the second establishing device 32 may begin to wirelessly communicate with the AP 4 using the non-WFD IP address for the printer 10 or the non-WFD IP address for the AP 4. Accordingly, the second establishing device 32 may establish a non-WFD network comprising the AP 4 and the printer 10. When the PC 6 has been connected to the AP 4 using a non-WFD connection, the printer 10 may execute communication of target data with the PC 6 through the AP 4.

Subsequently, in Step S76, the first establishing device 30 may judge whether a WFD network has been established. If a WFD network has been established (YES in Step S76), the process may proceed to Step S78, and, if a WFD network has not been established (NO in Step S76), the process of establishing a non-WFD network shown in FIG. 4 may end.

In Step S78, a second judgment device 40 may judge whether a current WFD IP address for the printer 10 used in the WFD network is in the range of IP addresses available in the non-WFD network. The processing in Step S78 may be the same as that in Step S30 shown in FIG. 2. If the current WFD IP address for the printer 10 is not in the above range (NO in Step S78), the process of establishing a non-WFD network shown in FIG. 4 may end. Accordingly, the determination device 34 may not execute the process of dynamically determining an IP address in Step S84. If the current WFD IP address for the printer 10 is in the above range (YES in Step S78), the process may proceed to Step S80.

In Step S80, the first establishing device 30 may judge whether the current state of the printer 10 is the G/O state or the client state. If the current state of the printer 10 is the G/O state (YES in Step S80), the process may proceed to Step S84, and, if the current state of the printer 10 is the client state (NO in Step S80), the process may proceed to Step S82.

The processing in Step S82 may be the same as that in Step S34 shown in FIG. 2. Accordingly, the change device 42 may change the intent value of the printer 10 from 2 to 14, for example. The first establishing device 30 may change the state of the printer 10 from the client state to the device state to terminate the WFD network. Consequently, a scenario is created in which the non-WFD network has been established without establishing the WFD network. Thus, a configuration is adopted in which the non-WFD network, which may be an enduring network, may take priority.

The processing in Step S84 may be the same as that in Step S26 shown in FIG. 2 (e.g., the same as the process shown in FIG. 3). Accordingly, the determination device 34 may determine a new WFD IP address for the printer 10 that may not be in the range of IP addresses available in the non-WFD network, a new range of IP addresses that may be assigned by the printer 10 as the DHCP server, and a new WFD IP address for the mobile terminal 8 (e.g., Step S60 shown in FIG. 3).

Subsequently, in Step S86, the determination device 34 may change the current WFD IP address for the printer 10 to the new WFD IP address for the printer 10 determined in Step S84. Furthermore, the determination device 34 may assign the new WFD IP address for the mobile terminal 8 determined in Step S84 to the mobile terminal 8. Thus, the mobile terminal 8 may use the new WFD IP address for the mobile terminal 8 instead of the current WFD IP address for the mobile terminal 8. The first establishing device 30 may begin to wirelessly communicate with the mobile terminal 8 using the new WFD IP address for the printer 10 or the new WFD IP address for the mobile terminal 8. Consequently, the first establishing device 30 may reestablish the non-WFD network. As a result, a scenario is created in which both the WFD network and the non-WFD network have been established. When Step S86 has been completed, the process of establishing a non-WFD network shown in FIG. 4 may end.

Subsequently, various examples of the processes executed by the components 4, 8, and 10 now are described with reference to Cases A1 and B shown in FIGS. 5 to 8. Process sequences shown in FIGS. 5 to 8 may be performed by the printer 10 by executing the processes in accordance with the flowcharts shown in FIGS. 2 to 4. In the following example cases, the printer 10 may adopt "255.255.255.0" as the default WFD subnet mask.

In Case A1, a non-WFD network may be established, and a WFD network subsequently may be established. When an instruction to build a non-WFD network has been input to the printer 10, the printer 10 may execute the communication for authentication with the AP 4 (Step S70 shown in FIG. 4). Subsequently, the printer 10 may obtain a non-WFD IP address "192.168.1.2" for the printer 10 and a non-WFD subnet mask "255.255.0.0" from the AP 4 (Step S72). Consequently, a non-WFD network is established (Step S74).

Subsequently, when an instruction to establish a WFD network has been input to the printer 10, the printer 10 may execute the G/O negotiation and the WPS negotiation with the mobile terminal 8 (Steps S10 and S12 shown in FIG. 2). The printer 10 may judge that the result of Step S14 is YES, and, if the current state of the printer 10 is the G/O state, the printer 10 may judge that the result of Step S24 is YES.

Subsequently, the printer 10 may determine a WFD IP address "192.169.1.1" for the printer 10 and a WFD IP address "192.169.1.2" for the mobile terminal 8 by referring to the non-WFD IP address "192.168.1.2" for the printer 10 (Step S26). Subsequently, the printer 10 may notify the mobile terminal 8 of the WFD IP address "192.169.1.2" for the mobile terminal 8 and the WFD subnet mask "255.255.255.0" (Step S20). Consequently, a WFD network is established (Step S20).

In the above-described scenario, the range of IP addresses "192.168.1-255.1-255" available in the non-WFD network and the range of IP addresses "192.169.1.1-255" available in the WFD network may not overlap. Therefore, the printer 10 may properly determine the IP addresses for the mobile terminal 8 and the printer 10 that are not comprised in the range of IP addresses available in the non-WFD network. Therefore, under a condition in which both the non-WFD network and the WFD network have been established, the printer 10 may properly execute communication using these networks.

If the current state of the printer 10 is the client state, the printer 10 may judge that the result of Step S24 is NO. Consequently, the printer 10 may obtain the WFD IP address for the printer 10 and the WFD subnet mask "255.255.255.0" from the mobile terminal 8 (Step S28). For example, if the non-WFD IP address for the printer 10 is "192.169.1.4," the printer 10 may judge the result of Step S30 is NO and may establish a WFD network using the WFD IP address "192.169.1.4" for the printer 10 (Step S32). In this scenario, the range of IP addresses "192.168.1-255.1-255" available in the non-WFD network and the range of IP addresses "192.169.1.1-255" available in the WFD network also may not overlap. Therefore, the printer 10 may properly execute communication using these networks.

Figure 6:
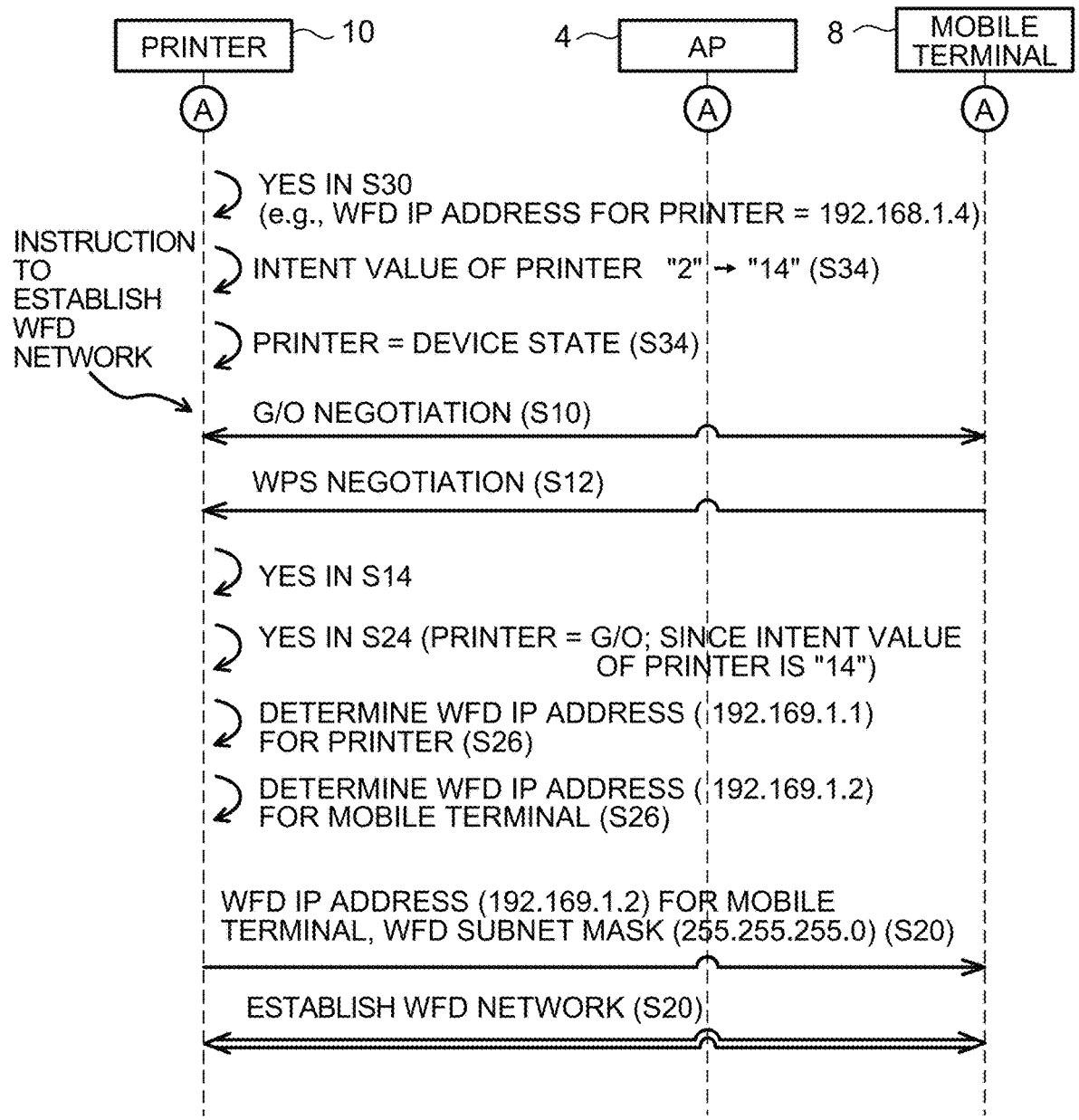
FIG. 6 is a diagram that shows a sequence of further processes that may occur in the Case A1.
Figure 7:
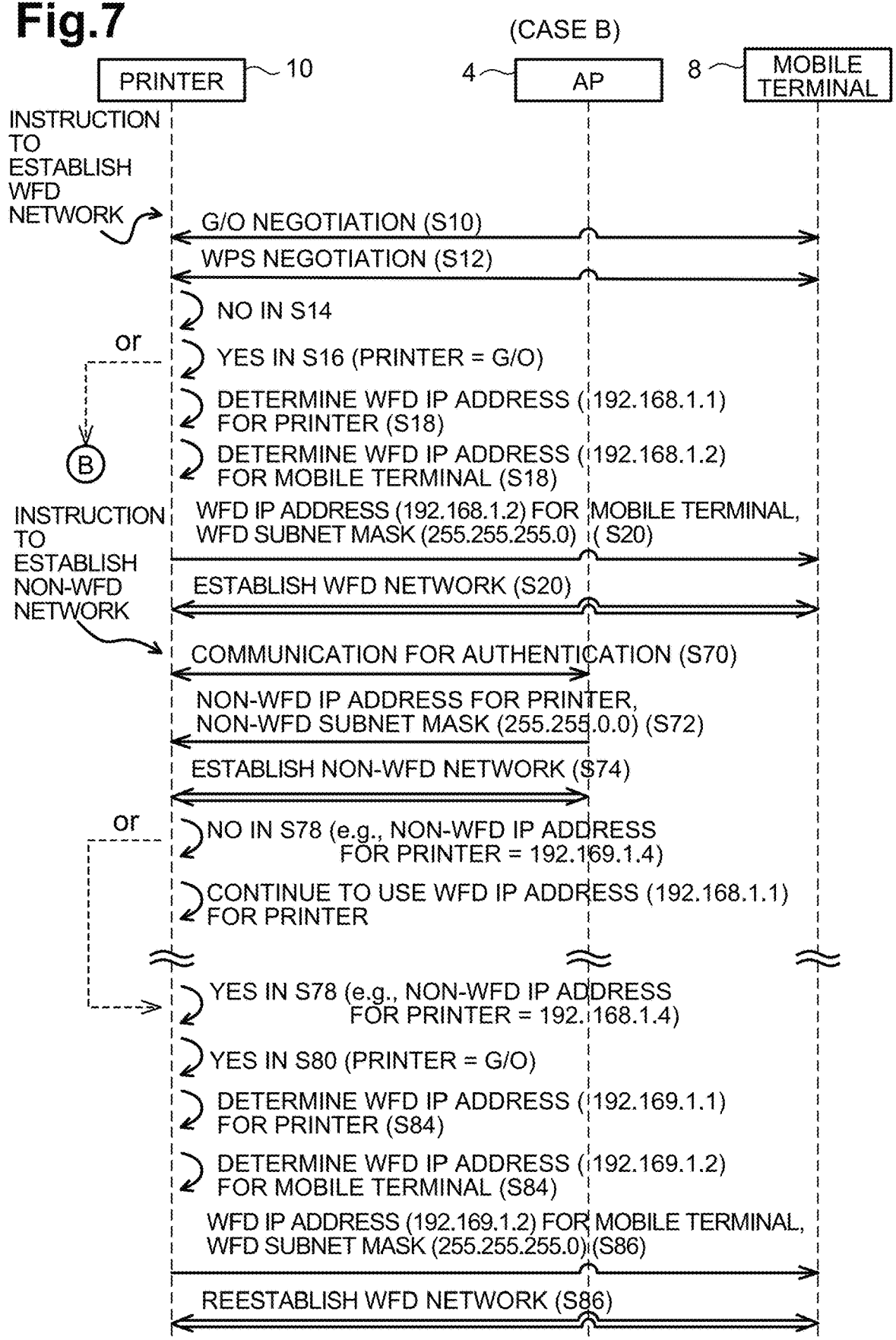
FIG. 7 is a diagram that shows a sequence of processes that may occur in a Case B.

If the WFD IP address for the printer 10 obtained from the mobile terminal 8 is "192.168.1.4," the printer 10 may judge that the result of Step S30 is YES as shown in FIG. 6. In this case, the printer 10 changes the intent value of the printer 10 from 2 to 14 (Step S34), for example, and changes the state of the printer 10 from the client state to the device state (Step S34). Consequently, the printer 10 does not build a WFD network.

Figure 5:
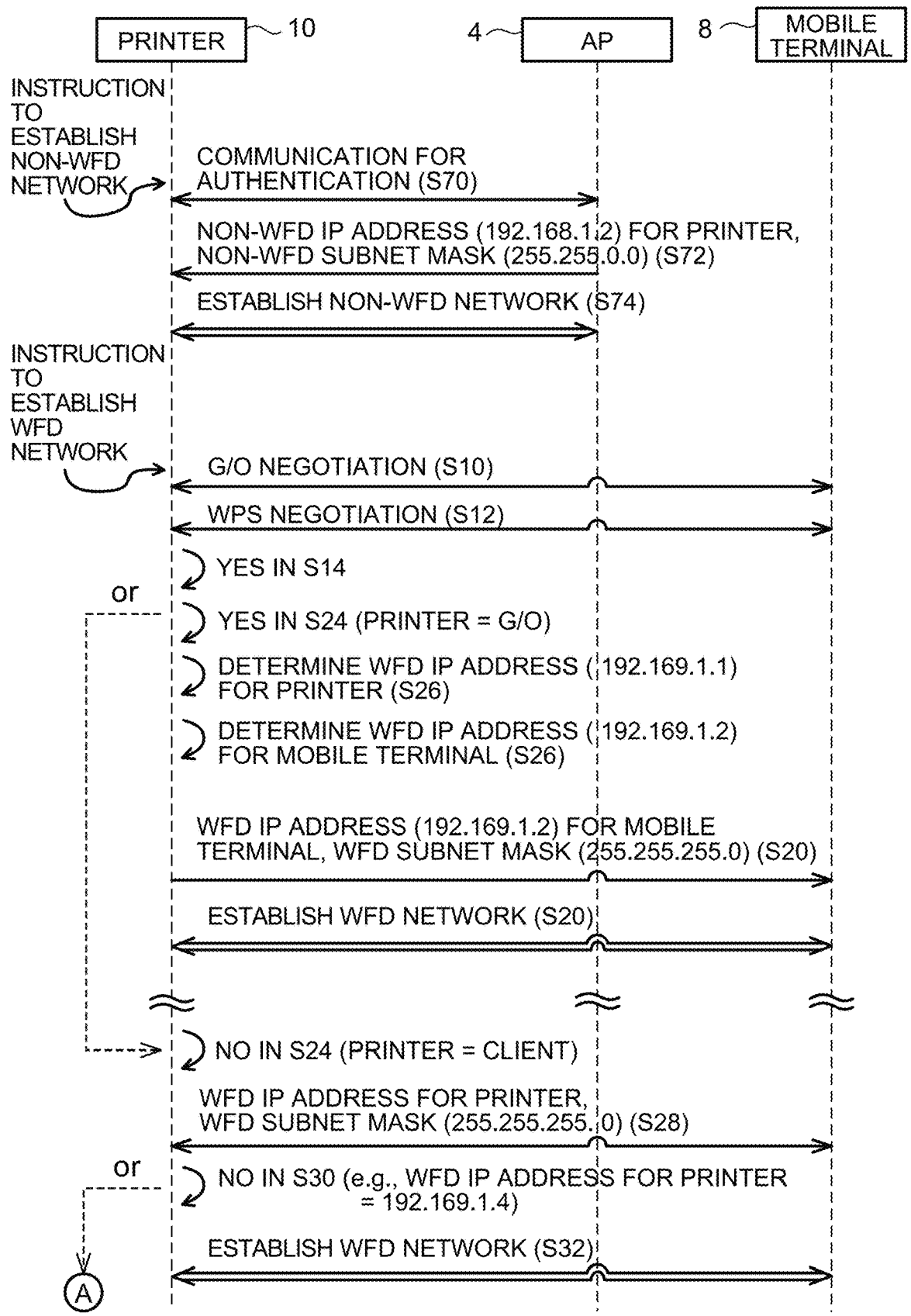
FIG. 5 is a diagram that shows a sequence of processes that may occur in a Case A1.

Subsequently, when an instruction to build a WFD network has been input to the printer 10 again, the printer 10 may execute the G/O negotiation and the WPS negotiation with the mobile terminal 8 (Step S10 and Step S12 shown in FIG. 2). In the G/O negotiation here, the printer 10 may normally be determined as the G/O because "14," for example, is used as the intent value of the printer 10. Therefore, the printer 10 may judge that the result of Step S14 is YES and subsequently may judge that the result of Step S24 is YES. The processing thereafter may be the same as that at a time when the result of Step S24 is YES as shown in FIG. 5. In this scenario, because the intent value of the printer 10 has been changed from 2 to 14, for example, the printer 10 may likely be determined as the G/O. Therefore, the printer 10 may properly determine the IP addresses for the mobile terminal 8 and the printer 10 that are not in the range of IP addresses available in the non-WFD network. Accordingly, the printer 10 may properly execute communication using these networks.

In Case B, a WFD network may be established, and, subsequently, a non-WFD network may be established. When an instruction to build a WFD network has been input to the printer 10, the printer 10 may execute the G/O negotiation and the WPS negotiation with the mobile terminal 8 (Step S10 and Step S12 shown in FIG. 2). Subsequently, the printer 10 may judge that the result of Step S14 is NO, and, if the current state of the printer 10 is the G/O state, the printer 10 may judge that the result of Step S16 is YES.

At this time, since the non-WFD network may not yet have been established, a non-WFD IP address may not yet be assigned to the printer 10. Therefore, the printer 10 may determine a WFD IP address "192.168.1.1" for the printer 10 and a WFD IP address "192.168.1.2" for the mobile terminal 8 without referring to the non-WFD IP address for the printer 10 (Step S18). Subsequently, the printer 10 may notify the mobile terminal 8 of the WFD IP address "192.168.1.2" for the mobile terminal 8 and a WFD subnet mask "255.255.255.0" (Step S20). Consequently, a WFD network may be established (Step S20).

Subsequently, when an instruction to build a non-WFD network has been input to the printer 10, the printer 10 may execute the communication for authentication with the AP 4 (Step S70 shown in FIG. 4). Subsequently, the printer 10 may obtain the non-WFD IP address for the printer 10 and a non-WFD subnet mask "255.255.0.0" from the AP 4 (Step S72). Consequently, a non-WFD network may be established (Step S74). If the non-WFD IP address for the printer 10 is "192.169.1.4," the printer 10 may judge that the result of Step S78 is NO and may continue to use the WFD IP address "192.168.1.1," such that the WFD network may remain established. In this scenario, the range of IP addresses "192.169.1-255.1-255" available in the non-WFD network and the range of IP addresses "192.168.1.1-255" available in the WFD network may not overlap. Therefore, the printer 10 may properly execute communication using these networks.

If the non-WFD IP address for the printer 10 obtained from the AP 4 is "192.168.1.4," for example, the printer 10 may judge that the result of Step S78 is YES and subsequently may judge that the result of Step S80 is YES. In this scenario, the printer 10 may determine a new WFD IP address "192.169.1.1" for the printer 10 and a new WFD IP address "192.169.1.2" for the mobile terminal 8 by referring to the non-WFD IP address "192.168.1.4" for the printer 10 (Step S84). Subsequently, the printer 10 may notify the mobile terminal 8 of the new WFD IP address "192.169.1.2" for the mobile terminal 8 and the WFD subnet mask "255.255.255.0" (Step S86). As a result, the WFD network may be reestablished (Step S86). Moreover, the range of IP addresses "192.168.1-255.1-255" available in the non-WFD network and the range of IP addresses "192.169.1.1-255" available in the WFD network may not overlap. Therefore, the printer 10 may properly determine the IP addresses for the mobile terminal 8 and the printer 10 that are not in the range of IP addresses available in the non-WFD network. Accordingly, the printer 10 may properly execute communication using these networks.

If the current state of the printer 10 is the client state, the printer 10 may judge that the result of Step S16 is NO as shown in FIG. 8. In this scenario, the printer 10 may obtain a WFD IP address "192.168.1.3" for the printer 10 and the WFD subnet mask "255.255.255.0" from the mobile terminal 8 (Step S22). Consequently, a WFD network may be established (Step S22).

Subsequently, when an instruction to build a non-WFD network has been input to the printer 10, the printer 10 may execute the communication for authentication with the AP 4 (Step S70 shown in FIG. 4). Subsequently, the printer 10 may obtain the non-WFD IP address for the printer 10 and the non-WFD subnet mask "255.255.0.0" from the AP 4 (Step S72). Consequently, a non-WFD network may be established (Step S74). For example, if the non-WFD IP address for the printer 10 obtained from the AP 4 is "192.169.1.4," the printer 10 may judge that the result of Step S78 is NO and may continue to use the WFD IP address "192.168.1.3" for the printer 10 to keep the condition in which the WFD network has been established. In this scenario, the range of IP addresses "192.169.1-255.1-255" available in the non-WFD network and the range of IP addresses "192.168.1.1-255" available in the WFD network may not overlap. Therefore, the printer 10 may properly execute communication using the WFD and non-WFD networks.

If, for example, the non-WFD IP address for the printer 10 obtained from the AP 4 is "192.168.1.4," the printer 10 may judge that the result of Step S78 is YES. In this scenario, the printer 10 may change the intent value of the printer 10 from 2 to 14 (Step S82), for example, and may change the state of the printer 10 from the client state to the device state (Step S82). Accordingly, the printer 10 may terminate the WFD network.

Subsequently, when an instruction to build a WFD network has been input to the printer 10 again, the printer 10 may execute the G/O negotiation and the WPS negotiation with the mobile terminal 8 (Step S10 and Step S12 shown in FIG. 2). In the G/O negotiation, the printer 10 may normally be determined as the G/O. This is because "14," for example, is used as the intent value of the printer 10. Therefore, the printer 10 may judge that the result of Step S14 is YES and subsequently may judge that the result of Step S24 is YES. The processing thereafter may be the same as that at a time when the result of Step S24 is YES shown in FIG. 5 or 6. In this scenario, the range of IP addresses "192.168.1-255.1-255" available in the non-WFD network and the range of IP addresses "192.169.1.1-255" available in the WFD network may not overlap. Therefore, the printer 10 may properly determine the IP addresses for the mobile terminal 8 and the printer 10 that are not in the range of IP addresses available in the non-WFD network. Accordingly, the printer 10 may properly execute communication using these networks.

According to the present embodiment, as shown in Case A1 shown in FIG. 5, the printer 10 may determine the WFD IP address "192.169.1.2" for the printer 10 by referring to the non-WFD IP address "192.168.1.2" for the mobile terminal 8 when a non-WFD network has been established and a WFD network is to be established. In addition, as shown in Case B shown in FIG. 7, the printer 10 may determine the WFD IP address "192.169.1.2" for the mobile terminal 8 by referring to the non-WFD IP address "192.168.1.4" for the printer 10 when a WFD network has been established and a non-WFD network is to be established. In either case, the printer 10 may properly determine the WFD IP address for the mobile terminal 8 that is not in the range of IP addresses available in the non-WFD network.

Accordingly, the printer 10 may properly execute the IP address assignment function such that the range of IP addresses available in the non-WFD network and the range of IP addresses available in the WFD network do not overlap. Therefore, when both the WFD network and the non-WFD network have been established, the printer 10 may properly transmit data to the mobile terminal 8 using the WFD network and, furthermore, may properly transmit data to the PC 6 through the AP 4 using the non-WFD network.

Certain configurations now are described with respect to FIGS. 9 and 10. The certain configurations of FIGS. 9 and 10 may comprise differences from configurations of FIGS. 1-8. In certain configurations, a process of establishing a WFD network shown in FIG. 9 may be executed instead of the process of establishing a WFD network shown in FIG. 2. In Step S100, the first establishing device 30 may judge whether a non-WFD network has been established. If a non-WFD network has been established (YES in Step S100), the process may proceed to Step S114, and, if a non-WFD network has not been established (NO in Step S100), the process may proceed to Step S102. Steps S102, S104, S106, S108, S110, and Step S112 may be the same as Steps S10, S12, S16, S18, S20, and S22 shown in FIG. 2.

In Step S114, the first establishing device 30 may set the printer 10 to an autonomous G/O mode. The autonomous G/O mode may be a mode in which the printer 10 may keep operating in the G/O state. Therefore, although a WFD connection may not be established at the time of Step S114, the printer 10 may be set to the G/O state. At this time, identification information regarding devices in the client state may not be described in the control list managed by the printer 10.

When the printer 10 has been set to the autonomous G/O mode in Step S114, the printer 10 may not execute the G/O negotiation. As disclosed above, when an instruction to establish a WFD connection has been input to the mobile terminal 8, the mobile terminal 8 may execute the search process of searching for devices in the client state existing around the mobile terminal 8. In certain configurations, the mobile terminal 8 also may execute the scan process of searching for a device in the G/O state (e.g., the printer 10) existing around the mobile terminal 8. Thus, the device list comprising information regarding the printer 10 may be displayed on the display of the mobile terminal 8. When the user of the mobile terminal 8 has selected the printer 10 in the G/O state from the device list, the mobile terminal 8 may determine the mobile terminal 8 as the client without executing the G/O negotiation.

Subsequently, in Step S116, the first establishing device 30 may execute the WPS negotiation for the G/O state. Thus, a WFD connection may be established between the printer 10 and the mobile terminal 8. Subsequently, in Step S118, the determination device 34 may execute the process of dynamically determining an IP address. Step S118 may be the same as the process shown in FIG. 3. When Step S118 has been completed, the process may proceed to Step S110.

In certain configurations, Case A2 shown in FIG. 10 may occur instead of Case A1 shown in FIGS. 5 and 6. The processing executed until a non-WFD network is established may be the same as that in Case A1 shown in FIG. 5. Subsequently, when an instruction to build a WFD network has been input to the printer 10, the printer 10 may set the printer 10 to the autonomous G/O mode (Step S114 shown in FIG. 9) and may execute the WPS negotiation for the G/O state (Step S116). The processing thereafter may be the same as that at a time when the result of Step S24 is YES shown in FIG. 5.

In Case A2 shown in FIG. 10, the printer 10 may set the printer 10 to the autonomous G/O mode when a non-WFD network has been established and a WFD network is to be established. Therefore, unlike Case A1 shown in FIG. 5, a condition (NO in Step S24 shown in FIG. 2) in which the printer 10 operates in the client state may not occur. Therefore, the printer 10 may certainly execute the process of dynamically determining an IP address (Step S116 shown in FIG. 10. Consequently, the printer 10 may properly determine the WFD IP address for the mobile terminal 8 that is not in the range of IP addresses available in the non-WFD network.

Although the specific examples of the present invention have been described in detail above, these are merely examples, and the scope of the claims is not limited thereby. The technology described in the claims may comprise various modifications and alterations of the above specific examples. Modifications of the above embodiments are listed hereinafter.

A "communication apparatus" may not be limited to the printer 10, and another apparatus (e.g., a mobile terminal, a PC, a server, a fax machine, a copying machine, a scanner, a multifunction device, or another device) that may execute communication may be used instead. In addition, a "first device" and a "second device" may not be limited to the mobile terminal 8 and the AP 4, respectively, and another device (e.g., a PC, a server, a printer, a fax machine, a copying machine, a scanner, a multifunction device, or another device) that may execute communication may be used instead.

In above-described configurations, the first establishing device 30 may establish a WFD network and the second establishing device 32 may establish a non-WFD network, which may be an infrastructure comprising the AP 4. For example, the first establishing device 30 may establish an ad hoc non-WFD network instead of the WFD network, and the second establishing device 32 may establish a non-WFD network as an infrastructure instead. In such configurations, the first establishing device 30 may dynamically determine the IP address for the mobile terminal 8 used in the ad hoc non-WFD network by referring to the IP address for the printer 10 used in the non-WFD network as an infrastructure. Alternatively, for example, the first establishing device 30 may establish a WFD network, and the second establishing device 32 may build an ad hoc non-WFD network instead of the non-WFD network as an infrastructure. Alternatively, for example, the first establishing device 30 may build a WFD network, and the second establishing device 32 may build a wired network instead of the non-WFD network, which may be a wireless network.

The determination device 34 may execute the following process of dynamically determining an IP address instead of the process of dynamically determining an IP address shown in FIG. 3. For example, the determination device 34 may adopt "255.255.0.0," which may be predetermined, as a determined subnet mask. Accordingly, the determination device 34 may determine the WFD IP address for the mobile terminal 8 by referring to the predetermined subnet mask "255.255.0.0," rather than the non-WFD subnet mask and the WFD subnet mask. In a general network, a subnet mask (e.g., "255.0.0.0") whose number of digits of the mask portion is less than the number of digits of the mask portion of "255.255.0.0" normally may not be used. Therefore, by adopting "255.255.0.0" as the determined subnet mask, the determination device 34 may properly determine the WFD IP address for the mobile terminal 8 that is not in the range of IP addresses available in the non-WFD network. Alternatively, for example, the determination device 34 may invariably adopt the non-WFD subnet mask as the determined subnet mask. Accordingly, the determination device 34 may determine the WFD IP address for the mobile terminal 8 by referring to the non-WFD subnet mask, rather than the WFD subnet mask (e.g., the default subnet mask). casein such a configuration, the determination device 34 may adopt the same value as the non-WFD subnet mask as the WFD subnet mask instead of the default subnet mask. Consequently, the determination device 34 may properly determine the WFD IP address for the mobile terminal 8 that is not in the range of IP addresses available in the non-WFD network. In general, a determination device may determine a target IP address by referring at least to a particular IP address.

In above-described configurations, the AP 4 may function as a DHCP server and may determine the non-WFD IP address for the printer 10. Instead of this, a non-WFD network comprising a particular DHCP server different from the AP 4 may be established. For example, the particular DHCP server may determine the non-WFD IP address for the printer 10.

The "master station state" may not be limited to the G/O state in WFD. Accordingly, it may be sufficient if a state is established in which a certain device controls other devices comprised in a wireless network (e.g., the certain device manages a list of information regarding the other devices, relays wireless communication between the other devices, or performs other actions). In addition, the "slave station state" may not be limited to the client state in WFD. Accordingly, it may be sufficient if a state is established in which a certain device is controlled by a device in the master station state. Therefore, the "first type network" may be a WFD network or a wireless network of another type, instead of the WFD network; and the "second type network" may be a network of yet another type.

In above-described configurations, the change device 42 may change the intent value of the printer 10 from 2 to 14, for example, in Step S34 shown in FIG. 2 and Step S82 shown in FIG. 4. Instead of this, the first establishing device 30 may set the printer 10 to the autonomous G/O mode in Step S34 shown in FIG. 2 and Step S82 shown in FIG. 4. In such configurations, when an instruction to build a WFD network has been input to the printer 10 again, the printer 10 may operate in the G/O state, and, therefore, the printer 10 may properly determine the WFD IP address for the mobile terminal 8. Alternatively, the first establishing device 30 may not change the intent value (furthermore, need not execute the setting of the autonomous G/O mode) in Step S34 shown in FIG. 2 and Step S82 shown in FIG. 4, but, instead, may generate a notification that a WFD network may not be established (e.g., the display device 14 may indicate an error). In such configurations, a user of the printer 10 may observe the notification and learn that a WFD network may not be established. Accordingly measures may be taken to establish a WFD network. For example, the printer 10 may be set to the autonomous G/O mode by operating (e.g., by manual operation by a user) the operation device 12 of the printer 10.

In configurations described above, in Step S114 shown in FIG. 9, the first establishing device 30 may receive the intent value of the mobile terminal 8 and may use an intent value greater than the intent value of the mobile terminal 8 as the intent value of the printer 10 before transmitting the intent value of the printer 10 to the mobile terminal 8, instead of setting the printer 10 to the autonomous G/O mode. In some configurations, when the printer 10 operates in the G/O state, the printer 10 may properly determine the WFD IP address for the mobile terminal 8.

In addition, in Step S114 shown in FIG. 9, the first establishing device 30 may change the intent value of the printer 10 from the default intent value (e.g., "2") to a greater value (e.g., "14") instead of setting the printer 10 to the autonomous G/O mode. In such configurations, because the printer 10 is likely to operate in the G/O state, the printer 10 may properly determine the WFD IP address for the mobile terminal 8.

In the above-described configurations, the first establishing device 30 may determine that the printer 10 is to be set to the G/O state when the intent value of the printer 10 is greater than the intent value of the mobile terminal 8 in the G/O negotiation (e.g., Step S10 shown in FIG. 2). Alternatively, the first establishing device 30 may determine that the printer 10 is to be set to the G/O state when the intent value of the printer 10 is less than the intent value of the mobile terminal 8. Although the "second setting value" may be greater than the "first setting value" in above-described configurations, the "second setting value" may be less than the "first setting value" when determining the G/O state in some configurations.

In above-described configurations, IP addresses according to IPv4 may be used. Alternatively, IP addresses that comply with the Internet Protocol version 6 ("IPv6") standard defined by IETF may be used. Accordingly, the determination device 34 may execute a process of determining an address, in which an IPv6 address that is not in the range of IPv6 addresses available in a second type network (e.g., a non-WFD network) may be determined by referring to an IPv6 address of a communication apparatus (e.g., the printer 10) used in the second type network, and the determined IPv6 address may be assigned to a first device (e.g., the mobile terminal 8).

In above-described configurations, the CPU 22 of the printer 10 may function as the components 30, 32, 34, 36, 38, 40, and 42 when executing processes in accordance with computer-readable instructions. Alternatively, at least some of the components 30, 32, 34, 36, 38, 40, and 42 may be realized by hardware, such as a logic circuit or an application specific integrated circuit.

While the invention has been described in connection with various exemplary structures and illustrative embodiments, it will be understood by those skilled in the art that other variations and modifications of the structures, configurations, and embodiments disclosed above may be made without departing from the scope of the invention. For example, this application comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. Other structures, configurations, and embodiments consistent with the scope of the claimed invention will be apparent to those skilled in the art from a consideration of the specification or practice of the invention disclosed herein. It is intended that the specification and the described examples are illustrative with the true scope of the invention being defined by the following claims.

What is claimed is:

1. A communication apparatus comprising:
a wireless interface;
a processor; and
a memory storing computer-readable instructions therein, the computer-readable instructions, when executed by the processor, instructing the communication apparatus to:
obtain a first Internet Protocol (IP) address of the communication apparatus to be used in a first wireless network in which a first external device different from the communication apparatus operates as an access point;
construct the first wireless network via the wireless interface in a case where the first IP address is obtained;
obtain a second IP address of the communication apparatus to be used in a second wireless network different from the first wireless network; and
construct the second wireless network in a case where a first network address of the first IP address is different from a second network address of the second IP address,
wherein the first wireless network is constructed in a case where the first network address is same as the second network address even if the first IP address is obtained after the second IP address has been obtained.

2. The communication apparatus according to claim 1, wherein
the first IP address is obtained from the first external device.

3. The communication apparatus according to claim 1, wherein
the second IP address is obtained from a second external device.

4. The communication apparatus according to claim 3, wherein
the second wireless network is a network in which the second external device operates as an access point.

5. The communication apparatus according to claim 1, wherein
the wireless interface is physically a single interface.

6. The communication apparatus according to claim 1, further comprising:
a display device,
wherein the computer-readable instructions, when executed by the processor, further instructs the communication apparatus to:
in the case where the first network address is same as the second network address, display on the display device an error indicating that it is not capable of constructing the second wireless network.

7. The communication apparatus according to claim 1, wherein
the second wireless network is a network complying Wi-Fi Direct standard, and
the first wireless network is not a network complying the Wi-Fi Direct standard.

8. The communication apparatus according to claim 1, wherein
the second wireless network is constructed in a case where the second IP address is obtained before the first IP address is obtained, and
the second wireless network is not constructed by a wireless connection between the communication apparatus and the second external device being terminated in the case where the first network address is same as the second network address even if the first IP address is obtained after the second IP address has been obtained and the second wireless network has been constructed.

9. A communication apparatus comprising:
a wireless interface;
a processor; and
a memory storing computer-readable instructions therein, the computer-readable instructions, when executed by the processor, instructing the communication apparatus to:
obtain a first Internet Protocol (IP) address of the communication apparatus to be used in a first wireless network in which a first external device different from the communication apparatus operates as an access point;
construct the first wireless network via the wireless interface in a case where the first IP address is obtained;
obtain a second IP address of the communication apparatus to be used in a second wireless network different from the first wireless network; and
construct the second wireless network in a case where a first value of a part of the first IP address masked by a first subnet mask of the first wireless network is different from a second value of a part of the second IP address masked by a second subnet mask of the second wireless network,
wherein the first wireless network is constructed in a case where the first value is same as the second value even if the first IP address is obtained after the second IP address has been obtained.

10. The communication apparatus according to claim 9, wherein
the first IP address is obtained from the first external device.

11. The communication apparatus according to claim 9, wherein
the second IP address is obtained from a second external device.

12. The communication apparatus according to claim 11, wherein
the second wireless network is a network in which the second external device operates as an access point.

13. The communication apparatus according to claim 9, wherein
the wireless interface is physically a single interface.

14. The communication apparatus according to claim 9, further comprising:
a display device,
wherein the computer-readable instructions, when executed by the processor, further instructs the communication apparatus to:
in the case where the first value is same as the second value, display on the display device an error indicating that it is not capable of constructing the second wireless network.

15. The communication apparatus according to claim 9, wherein
the second wireless network is a network complying Wi-Fi Direct standard, and
the first wireless network is not a network complying the Wi-Fi Direct standard.

16. The communication apparatus according to claim 9, wherein
the second wireless network is constructed in a case where the second IP address is obtained before the first IP address is obtained, and the second wireless network is not constructed by a wireless connection between the communication apparatus and the second external device being terminated in the case where the first value is same as the second value even if the first IP address is obtained after the second IP address has been obtained and the second wireless network has been constructed.

* * * * *